United States Patent
Zhang et al.

(10) Patent No.: US 10,631,296 B2
(45) Date of Patent: Apr. 21, 2020

(54) RESOURCE ALLOCATION METHOD, APPARATUS, AND WIRELESS ACCESS SYSTEM

(71) Applicant: HUAWEI TECHNOLOGIES CO., LTD., Shenzhen, Guangdong (CN)

(72) Inventors: Jian Zhang, Shenzhen (CN); Qinghai Zeng, Shanghai (CN); Yada Huang, Shanghai (CN); Lixia Xue, Beijing (CN); Yuanjie Li, Shanghai (CN); Mingzeng Dai, Shanghai (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 46 days.

(21) Appl. No.: 15/940,450

(22) Filed: Mar. 29, 2018

(65) Prior Publication Data
US 2018/0220425 A1    Aug. 2, 2018

Related U.S. Application Data

(63) Continuation of application No. PCT/CN2016/098487, filed on Sep. 8, 2016.

(30) Foreign Application Priority Data

Sep. 30, 2015    (CN) .......................... 2015 1 0646196

(51) Int. Cl.
*H04W 72/04*    (2009.01)
*H04W 72/00*    (2009.01)
*H04W 88/10*    (2009.01)

(52) U.S. Cl.
CPC ....... *H04W 72/0453* (2013.01); *H04W 72/00* (2013.01); *H04W 72/042* (2013.01); *H04W 72/0406* (2013.01); *H04W 88/10* (2013.01)

(58) Field of Classification Search
CPC .............. H04W 72/0413; H04W 48/20; H04L 5/0037; H04L 47/193; H04Q 7/20; H04J 3/16
See application file for complete search history.

(56) References Cited

U.S. PATENT DOCUMENTS

| 2007/0223516 A1 | 9/2007 | Dunn et al. |
| 2008/0076432 A1* | 3/2008 | Senarath ............... H04W 36/18 455/442 |

(Continued)

FOREIGN PATENT DOCUMENTS

| CN | 101516098 A | 8/2009 |
| CN | 102257735 A | 11/2011 |

(Continued)

OTHER PUBLICATIONS

XP051043734 RWS-150008 Panasonic, "View on RAT and IMT-2020",3GPP RAN workshop on 5G,Phoenix, AZ, USA, Sep. 17-18, 2015,total 12 pages.

(Continued)

*Primary Examiner* — Iqbal Zaidi
(74) *Attorney, Agent, or Firm* — Womble Bond Dickinson (US) LLP

(57) ABSTRACT

Embodiments of the present disclosure describe a resource allocation method, an apparatus, and a wireless access system. One embodiment of the method may include a wireless access device determining at least two first AI technologies to be used to transmit a service between UE and the wireless access device,allocating on a first carrier, at least two first resources that are in a one-to-one correspondence with the at least two first AI technologies, and sending first resource allocation information to the UE, where the first resource allocation information is used to indicate a first resource corresponding to a first AI technology to be used by UE that receives the first resource allocation information.

20 Claims, 15 Drawing Sheets

(56) References Cited

U.S. PATENT DOCUMENTS

| | | | |
|---|---|---|---|
| 2009/0209265 A1 | 8/2009 | Kwon et al. | |
| 2014/0064193 A1* | 3/2014 | Yacobi | H04W 72/1215 |
| | | | 370/329 |
| 2014/0066083 A1 | 3/2014 | Hui et al. | |
| 2014/0177507 A1 | 6/2014 | Hsu | |
| 2016/0270013 A1* | 9/2016 | Soriaga | H04W 56/0015 |

FOREIGN PATENT DOCUMENTS

| | | |
|---|---|---|
| CN | 103391597 A | 11/2013 |
| CN | 103906141 A | 7/2014 |
| EP | 2928238 A1 | 10/2015 |
| WO | 2009148650 A1 | 12/2009 |
| WO | 2014084475 A1 | 6/2014 |
| WO | 2016130175 A1 | 8/2016 |

OTHER PUBLICATIONS

XP051294282 3GPP TR 37.870 V13.0.0 (Jun. 2016),3rd Generation Partnership Project;Technical Specification Group Radio Access Network;Study on Multiple Radio Access Technology (Multi-RAT) jointcoordination(Release 13),total 24 pages.

* cited by examiner

RESOURCE ALLOCATION METHOD, APPARATUS, AND WIRELESS ACCESS SYSTEM

CROSS-REFERENCE TO RELATED APPLICATIONS

This application is a continuation of International Application No. PCT/CN2016/098487, filed on Sep. 8, 2016, which claims priority to Chinese Patent Application No. 201510646196.6, filed on Sep. 30, 2015, the disclosures of the aforementioned applications are hereby incorporated by reference in their entireties.

TECHNICAL FIELD

The present disclosure relates to the field of communications, and in particular, to a resource allocation method, an apparatus, and a wireless access system.

BACKGROUND

With continuous development of communications technologies, a wireless communications system can support an increasingly large quantity of air interface (AI) technologies.

Generally, in a possible application scenario, for example, user equipment (UE) needs to transmit a multimedia broadcast multicast service (MBMS) and a unicast service on a carrier simultaneously. AI technologies used by the UE to transmit the MBMS and the unicast service (for example, frame structures used by the UE to transmit the MBMS and the unicast service) are different. Therefore, simultaneous transmission of the MBMS and the unicast service by the UE may be usually implemented on the carrier by using a time division manner. Specifically, when allocating, to the UE, a resource for transmitting a service, a base station may configure, on the carrier for the MBMS service, some dedicated multimedia broadcast multicast single frequency network (MBMSFN) subframes used to transmit the MBMS service. The remaining subframes are used to transmit the unicast service.

However, in the wireless communications system, when the UE needs to transmit services on one carrier by using multiple AI technologies, only the foregoing time division manner can be used for implementation on the carrier. That is, some dedicated subframes can be used only when the UE uses one AI technology but cannot be used when the UE uses another AI technology. Once being allocated, these dedicated subframes stay unchanged. Therefore, the time division manner may cause relatively low resource utilization and inflexible resource utilization manners.

SUMMARY

Embodiments of the present invention provide a resource allocation method, an apparatus, and a wireless access system, so as to improve resource utilization and make resource utilization manners more flexible.

According to a first aspect, an embodiment of the present invention provides a resource allocation method. The resource allocation method includes:

determining, by a wireless access device, at least two first air interface AI technologies to be used to transmit a service between user equipment UE and the wireless access device;

allocating, by the wireless access device on a first carrier, at least two first resources that are in a one-to-one correspondence with the at least two first AI technologies, where the at least two first resources are used to transmit the service between the UE and the wireless access device; and sending, by the wireless access device, first resource allocation information to the UE, where the first resource allocation information is used to indicate a first resource corresponding to a first AI technology to be used by UE that receives the first resource allocation information.

With reference to the first aspect, in a first possible embodiment of the first aspect, the determining, by a wireless access device, at least two first AI technologies to be used to transmit a service between UE and the wireless access device includes:

obtaining, by the wireless access device, first information, where the first information is used to determine the at least two first AI technologies to be used to transmit the service between the UE and the wireless access device; and determining, by the wireless access device, the at least two first AI technologies according to the first information.

With reference to the first aspect or the first possible embodiment of the first aspect, in a second possible embodiment of the first aspect, before the sending, by the wireless access device, first resource allocation information to the UE, the resource allocation method further includes:

sending, by the wireless access device, common control information to the UE, where the common control information includes resource information of dedicated control information, the common control information is control information in a common frequency range of the at least two first AI technologies on the first carrier, the dedicated control information is control information in a frequency range separately occupied on the first carrier by each first AI technology of the at least two first AI technologies, and the resource information of the dedicated control information is used by the UE to receive the dedicated control information;

the sending, by the wireless access device, first resource allocation information to the UE includes:

sending, by the wireless access device, the dedicated control information to the UE, where the dedicated control information includes the first resource allocation information.

With reference to the first aspect or the first possible embodiment of the first aspect, in a third possible embodiment of the first aspect, before the determining, by a wireless access device, at least two first AI technologies to be used to transmit a service between UE and the wireless access device, the resource allocation method further includes:

sending, by the wireless access device, a radio resource control RRC reconfiguration message to the UE, where the RRC reconfiguration message includes resource information of dedicated control information, the resource information of the dedicated control information includes a resource location of the dedicated control information and an index of the dedicated control information, and the dedicated control information is control information in a frequency range separately occupied on the first carrier by each first AI technology of the at least two first AI technologies;

before the sending, by the wireless access device, first resource allocation information to the UE, the resource allocation method further includes:

sending, by the wireless access device, common control information to the UE, where the common control information includes the index of the dedicated control information, the common control information is control information in a common frequency range of the at least two first AI technologies on the first carrier, and the index of the dedicated control information and the resource information of the dedicated control information are used by the UE to receive the dedicated control information;

the sending, by the wireless access device, first resource allocation information to the UE includes:

sending, by the wireless access device, the dedicated control information to the UE, where the dedicated control information includes the first resource allocation information.

With reference to the first aspect or the first possible embodiment of the first aspect, in a fourth possible embodiment of the first aspect, the sending, by the wireless access device, first resource allocation information to the UE includes:

sending, by the wireless access device, control information to the UE, where the control information includes the first resource allocation information.

With reference to the first aspect or any embodiment of the first possible embodiment to the fourth possible embodiment of the first aspect, in a fifth possible embodiment of the first aspect, the resource allocation method further includes:

sending, by the wireless access device, common system information, where the common system information includes resource information of dedicated system information, the common system information is system information in the common frequency range of the at least two first AI technologies on the first carrier, the dedicated system information is system information in a frequency range separately occupied on the first carrier each first AI technology of the at least two first AI technologies, and the resource information of the dedicated system information is used by the UE to receive the dedicated system information; and sending, by the wireless access device, the dedicated system information.

With reference to the first aspect or any embodiment of the first possible embodiment to the fifth possible embodiment of the first aspect, in a sixth possible embodiment of the first aspect, the resource allocation method further includes:

sending, by the wireless access device, measurement configuration information or demodulation reference signals DMRSs corresponding to the at least two first AI technologies to the UE, where the measurement configuration information or the DMRSs are used to instruct the UE to perform radio resource management RRM measurement or channel state information CSI measurement, where the measurement configuration information is carried in the dedicated control information; or, the measurement configuration information is carried in the dedicated system information; or, the measurement configuration information is carried in the RRC reconfiguration message.

With reference to the first aspect or any embodiment of the first possible embodiment to the sixth possible embodiment of the first aspect, in a seventh possible embodiment of the first aspect, the at least two first AI technologies include a first sub-AI technology and at least one second sub-AI technology, the at least two first resources include a first subresource corresponding to the first sub-AI technology and at least one second subresource that corresponds one by one to the at least one second sub-AI technology, and the allocating, by the wireless access device on a first carrier, at least two first resources that are in a one-to-one correspondence with the at least two first AI technologies includes:

allocating, by the wireless access device, the first subresource on the first carrier;

allocating, by the wireless access device, the at least one second subresource on a resource other than the first subresource on the first carrier, where a bandwidth of the first subresource and a bandwidth of each second subresource of the at least one second subresource are both less than a bandwidth of the first carrier.

With reference to the first aspect or any embodiment of the first possible embodiment to the sixth possible embodiment of the first aspect, in an eighth possible embodiment of the first aspect, the at least two first AI technologies include a first sub-AI technology and at least one second sub-AI technology, the at least two first resources include a first subresource corresponding to the first sub-AI technology and at least one second subresource that corresponds one by one to the at least one second sub-AI technology, and the allocating, by the wireless access device on a first carrier, at least two first resources that are in a one-to-one correspondence with the at least two first AI technologies includes:

allocating, by the wireless access device, the first subresource on the first carrier;

allocating, by the wireless access device, the at least one second subresource on an idle resource of the first subresource, where a bandwidth of each second subresource of the at least one second subresource is less than a bandwidth of the first subresource.

With reference to the first aspect or any embodiment of the first possible embodiment to the eighth possible embodiment of the first aspect, in a ninth possible embodiment of the first aspect, the wireless access device is a primary base station, and the resource allocation method further includes:

receiving, by the primary base station, capability information sent by a secondary base station, where the capability information is used to indicate an AI technology supported by the secondary base station, and the primary base station and the secondary base station perform carrier aggregation;

determining, by the primary base station, requirement information of the primary base station according to the capability information, where the requirement information is used to instruct the secondary base station to allocate at least one second resource on a second carrier, the at least one second resource is used to transmit the service between the UE and the secondary base station, at least one second AI technology needs to be used to transmit the service between the UE and the secondary base station, the at least one second resource corresponds one by one to the at least one second AI technology, and the at least one second AI technology is at least one AI technology of AI technologies supported by the secondary base station;

sending, by the primary base station, a secondary base station addition message to the secondary base station, where the secondary base station addition message includes the requirement information;

receiving, by the primary base station, resource configuration information sent by the secondary base station, where the resource configuration information is used to indicate the at least one second resource;

sending, by the primary base station, second resource allocation information to the UE, where the second resource allocation information is used to indicate a second resource corresponding to a second AI technology to be used by UE that receives the second resource allocation information.

With reference to the ninth possible embodiment of the first aspect, in a tenth possible embodiment of the first aspect, a mapping relationship between the at least two first AI technologies and a data radio bearer DRB established by the primary base station and a mapping relationship between the at least one second AI technology and the DRB are both sent by the primary base station to the UE by using an RRC reconfiguration message.

According to a second aspect, an embodiment of the present invention provides a resource allocation method. The resource allocation method includes:

receiving, by user equipment UE, first resource allocation information sent by a wireless access device, where the first resource allocation information is used to indicate at least two first resources allocated on a first carrier by the wireless access device, the at least two first resources are used to transmit a service between the UE and the wireless access device, at least two first air interface AI technologies to be used to transmit the service between the UE and the wireless access device, and the at least two first AI technologies are in a one-to-one correspondence with the at least two first resources; and using, by the UE according to the first resource allocation information and on each first resource of the at least two first resources indicated by the first resource allocation information, a first AI technology corresponding to the first resource to transmit the service between the UE and the wireless access device.

With reference to the second aspect, in a first possible embodiment of the second aspect, before the receiving, by UE, first resource allocation information sent by a wireless access device, the resource allocation method further includes:

receiving, by the UE, common control information sent by the wireless access device, where the common control information includes resource information of dedicated control information, the common control information is control information in a common frequency range of the at least two first AI technologies on the first carrier, and the dedicated control information is control information in a frequency range separately occupied on the first carrier by each first AI technology of the at least two first AI technologies; and the receiving, by the UE, first resource allocation information sent by a wireless access device includes:

receiving, by the UE according to the resource information of the dedicated control information, the dedicated control information sent by the wireless access device, where the dedicated control information includes the first resource allocation information.

With reference to the second aspect, in a second possible embodiment of the second aspect, before the receiving, by UE, first resource allocation information sent by a wireless access device, the resource allocation method further includes:

receiving, by the UE, a radio resource control RRC reconfiguration message sent by the wireless access device, where the RRC reconfiguration message includes resource information of dedicated control information, the resource information of the dedicated control information includes a resource location of the dedicated control information and an index of the dedicated control information, and the dedicated control information is control information in a frequency range separately occupied on the first carrier by each first AI technology of the at least two first AI technologies; and receiving, by the UE, common control information sent by the wireless access device, where the common control information includes the index of the dedicated control information, and the common control information is control information in a common frequency range of the at least two first AI technologies on the first carrier; and the receiving, by the UE, first resource allocation information sent by a wireless access device includes:

receiving, by the UE according to the index of the dedicated control information and the resource information of the dedicated control information, the dedicated control information sent by the wireless access device, where the dedicated control information includes the first resource allocation information.

With reference to the second aspect, in a third possible embodiment of the second aspect, the receiving, by the UE, first resource allocation information sent by a wireless access device includes:

receiving, by the UE, control information sent by the wireless access device, where the control information includes the first resource allocation information.

With reference to the second aspect or any embodiment of the first possible embodiment to the third possible embodiment of the second aspect, in a fourth possible embodiment of the second aspect, the resource allocation method further includes:

receiving, by the UE, common system information sent by the wireless access device, where the common system information includes resource information of dedicated system information, the common system information is system information in the common frequency range of the at least two first AI technologies on the first carrier, and the dedicated system information is system information in a frequency range separately occupied on the first carrier by each first AI technology of the at least two first AI technologies;

receiving, by the UE according to the resource information of the dedicated system information, the dedicated system information sent by the wireless access device.

With reference to the second aspect or any embodiment of the first possible embodiment to the fourth possible embodiment of the second aspect, in a fifth possible embodiment of the second aspect, the resource allocation method further includes:

receiving, by the UE, measurement configuration information or demodulation reference signals DMRSs that are sent by the wireless access device and that correspond to the at least two first AI technologies, where the measurement configuration information or the DMRSs are used to instruct the UE to perform radio resource management RRM measurement or channel state information CSI measurement; and separately performing, by the UE, RRM measurement or CSI measurement corresponding to the at least two first AI technologies according to the measurement configuration information or the DMRSs, where the measurement configuration information is carried in the dedicated control information; or, the measurement configuration information is carried in the dedicated system information; or, the measurement configuration information is carried in the RRC reconfiguration message.

With reference to the second aspect or any embodiment of the first possible embodiment to the fifth possible embodiment of the second aspect, in a sixth possible embodiment of the second aspect, the wireless access device is a primary base station, and the resource allocation method further includes:

receiving, by the UE, second resource allocation information sent by the primary base station, where the second resource allocation information is used to indicate at least one second resource allocated on a second carrier by a secondary base station, the at least one second resource is used to transmit the service between the UE and the secondary base station, at least one second AI technology needs to be used to transmit the service between the UE and the secondary base station, the at least one second resource corresponds one by one to the at least one second AI technology, the at least one second AI technology is at least one AI technology of AI technologies supported by the secondary base station, and the primary base station and the secondary base station perform carrier aggregation; and using, by the UE according to the second resource allocation information and on each second resource in the at least one second resource indicated by the second resource allocation information, a second AI technology corresponding to the second resource to transmit the service between the UE and the secondary base station.

With reference to the sixth possible embodiment of the second aspect, in a seventh possible embodiment of the second aspect, a mapping relationship between the at least two first AI technologies and a data radio bearer DRB established by the primary base station and a mapping relationship between the at least one second AI technology and the DRB are both sent by the primary base station to the UE by using an RRC reconfiguration message.

According to a third aspect, an embodiment of the present invention provides a wireless access device. The wireless access device includes:

a determining unit, configured to determine at least two first air interface AI technologies to be used to transmit a service between user equipment UE and the wireless access device;

an allocation unit, configured to allocate, on a first carrier, at least two first resources that are in a one-to-one correspondence with the at least two first AI technologies determined by the determining unit, where the at least two first resources are used to transmit the service between the UE and the wireless access device; and a sending unit, configured to send first resource allocation information to the UE, where the first resource allocation information is used to indicate a first resource that is allocated by the allocation unit and that corresponds to a first AI technology to be used by UE that receives the first resource allocation information.

With reference to the third aspect, in a first possible embodiment of the third aspect, the determining unit is specifically configured to: obtain first information, and determine, according to the first information, the at least two first AI technologies to be used to transmit the service between the UE and the wireless access device, where the first information is used to determine the at least two first AI technologies.

With reference to the third aspect or the first possible embodiment of the third aspect, in a second possible embodiment of the third aspect, the sending unit is further configured to: before sending the first resource allocation information to the UE, send common control information to the UE, where the common control information includes resource information of dedicated control information, the common control information is control information in a common frequency range of the at least two first AI technologies on the first carrier, the dedicated control information is control information in a frequency range separately occupied on the first carrier by each first AI technology of the at least two first AI technologies, and the resource information of the dedicated control information is used by the UE to receive the dedicated control information; and the sending unit is specifically configured to send the dedicated control information to the UE, where the dedicated control information includes the first resource allocation information.

With reference to the third aspect or the first possible embodiment of the third aspect, in a third possible embodiment of the third aspect, the sending unit is further configured to: before the determining unit determines the at least two first AI technologies to be used to transmit the service between the UE and the wireless access device, send a radio resource control RRC reconfiguration message to the UE, where the RRC reconfiguration message includes resource information of dedicated control information, the resource information of the dedicated control information includes a resource location of the dedicated control information and an index of the dedicated control information, and the dedicated control information is control information in a frequency range separately occupied on the first carrier by each first AI technology of the at least two first AI technologies;

the sending unit is further configured to: before sending the first resource allocation information to the UE, send common control information to the UE, where the common control information includes the index of the dedicated control information, the common control information is control information in a common frequency range of the at least two first AI technologies on the first carrier, and the index of the dedicated control information and the resource information of the dedicated control information are used by the UE to receive the dedicated control information; and the sending unit is specifically configured to send the dedicated control information to the UE, where the dedicated control information includes the first resource allocation information.

With reference to the third aspect or the first possible embodiment of the third aspect, in a fourth possible embodiment of the third aspect, the sending unit is specifically configured to send control information to the UE, where the control information includes the first resource allocation information.

With reference to the third aspect or any embodiment of the first possible embodiment to the fourth possible embodiment of the third aspect, in a fifth possible embodiment of the third aspect, the sending unit is further configured to send common system information and dedicated system information, where the common system information includes resource information of the dedicated system information, the common system information is system information in the common frequency range of the at least two first AI technologies on the first carrier, the dedicated system information is system information in a frequency range separately occupied on the first carrier by each first AI technology of the at least two first AI technologies, and the resource information of the dedicated system information is used by the UE to receive the dedicated system information.

With reference to the third aspect or any embodiment of the first possible embodiment to the fifth possible embodiment of the third aspect, in a sixth possible embodiment of the third aspect, the sending unit is further configured to send measurement configuration information or demodulation reference signals DMRSs corresponding to the at least two first AI technologies to the UE, where the measurement configuration information or the DMRSs are used to instruct the UE to perform radio resource management RRM measurement or channel state information CSI measurement, where the measurement configuration information is carried in the dedicated control information; or, the measurement configuration information is carried in the dedicated system information; or, the measurement configuration information is carried in the RRC reconfiguration message.

With reference to the third aspect or any embodiment of the first possible embodiment to the sixth possible embodiment of the third aspect, in a seventh possible embodiment of the third aspect, the at least two first AI technologies include a first sub-AI technology and at least one second sub-AI technology, the at least two first resources include a first subresource corresponding to the first sub-AI technology and at least one second subresource that corresponds one by one to the at least one second sub-AI technology, and the allocation unit is specifically configured to: allocate the first subresource on the first carrier, and allocate the at least one second subresource on a resource other than the first subresource on the first carrier, where a bandwidth of the first subresource and a bandwidth of each second subresource of the at least one second subresource are both less than a bandwidth of the first carrier.

With reference to the third aspect or any embodiment of the first possible embodiment to the sixth possible embodiment of the third aspect, in an eighth possible embodiment of the third aspect, the at least two first AI technologies include a first sub-AI technology and at least one second sub-AI technology, the at least two first resources include a first subresource corresponding to the first sub-AI technology and at least one second subresource that corresponds one by one to the at least one second sub-AI technology, and the allocation unit is specifically configured to: allocate the first subresource on the first carrier, and allocate the at least one second subresource on an idle resource of the first subresource, where a bandwidth of each second subresource of the at least one second subresource is less than a bandwidth of the first subresource.

With reference to the third aspect or any embodiment of the first possible embodiment to the eighth possible embodiment of the third aspect, in a ninth possible embodiment of the third aspect, the wireless access device is a primary base station, and the primary base station further includes a receiving unit, where the receiving unit is configured to receive capability information sent by a secondary base station, where the capability information is used to indicate an AI technology supported by the secondary base station, and the primary base station and the secondary base station perform carrier aggregation;

the determining unit is further configured to determine requirement information of the primary base station, where the requirement information is used to instruct the secondary base station to allocate at least one second resource on a second carrier, the at least one second resource is used to transmit the service between the UE and the secondary base station, at least one second AI technology needs to be used to transmit the service between the UE and the secondary base station, the at least one second resource corresponds one by one to the at least one second AI technology, and the at least one second AI technology is at least one AI technology of AI technologies that are received by the receiving unit and that are supported by the secondary base station;

the sending unit is further configured to send a secondary base station addition message to the secondary base station, where the secondary base station addition message includes the requirement information determined by the determining unit;

the receiving unit is further configured to receive resource configuration information sent by the secondary base station, where the resource configuration information is used to indicate the at least one second resource;

the sending unit is further configured to send second resource allocation information to the UE, where the second resource allocation information is used to indicate a second resource corresponding to a second AI technology to be used by UE that receives the second resource allocation information.

With reference to the ninth possible embodiment of the third aspect, in a tenth possible embodiment of the third aspect, a mapping relationship between the at least two first AI technologies determined by the determining unit and a data radio bearer DRB established by the primary base station and a mapping relationship between the at least one second AI technology received by the receiving unit and the DRB are both sent by the sending unit to the UE by using an RRC reconfiguration message.

According to a fourth aspect, an embodiment of the present invention provides user equipment UE. The UE includes:

a receiving unit, configured to receive first resource allocation information sent by a wireless access device, where the first resource allocation information is used to indicate at least two first resources allocated on a first carrier by the wireless access device, the at least two first resources are used to transmit a service between the UE and the wireless access device, at least two first air interface AI technologies to be used to transmit the service between the UE and the wireless access device, and the at least two first AI technologies are in a one-to-one correspondence with the at least two first resources; and a transmission unit, configured to use, according to the first resource allocation information received by the receiving unit and on each first resource of the at least two first resources indicated by the first resource allocation information, a first AI technology corresponding to the first resource to transmit the service between the UE and the wireless access device.

With reference to the fourth aspect, in a first possible embodiment of the fourth aspect, the receiving unit is further configured to: before receiving the first resource allocation information sent by the wireless access device, receive common control information sent by the wireless access device, where the common control information includes resource information of dedicated control information, the common control information is control information in a common frequency range of the at least two first AI technologies on the first carrier, and the dedicated control information is control information in a frequency range separately occupied on the first carrier by each first AI technology of the at least two first AI technologies; and the receiving unit is specifically configured to receive, according to the resource information of the dedicated control information, the dedicated control information sent by the wireless access device, where the dedicated control information includes the first resource allocation information.

With reference to the fourth aspect, in a second possible embodiment of the fourth aspect, the receiving unit is further configured to: before receiving the first resource allocation information sent by the wireless access device, receive a radio resource control RRC reconfiguration message and common control information sent by the wireless access device, where the RRC reconfiguration message includes resource information of dedicated control information, the resource information of the dedicated control information includes a resource location of the dedicated control information and an index of the dedicated control information, the dedicated control information is control information in a frequency range separately occupied on the first carrier by each first AI technology of the at least two first AI technologies, the common control information includes the index of the dedicated control information, and the common control information is control information in a common frequency range of the at least two first AI technologies on the first carrier; and the receiving unit is specifically configured to receive, according to the index of the dedicated control information and the resource information of the dedicated control information, the dedicated control information sent by the wireless access device, where the dedicated control information includes the first resource allocation information.

With reference to the fourth aspect, in a third possible embodiment of the fourth aspect, the receiving unit is specifically configured to receive control information sent by the wireless access device, where the control information includes the first resource allocation information.

With reference to the fourth aspect or any embodiment of the first possible embodiment to the third possible embodiment of the fourth aspect, in a fourth possible embodiment of the fourth aspect, the receiving unit is further configured to: receive common system information sent by the wireless access device, where the common system information includes resource information of dedicated system information, and receive, according to the resource information of the dedicated system information, the dedicated system information sent by the wireless access device, the common system information is system information in the common frequency range of the at least two first AI technologies on the first carrier, and the dedicated system information is system information in a frequency range separately occupied on the first carrier by each first AI technology of the at least two first AI technologies.

With reference to the fourth aspect or any embodiment of the first possible embodiment to the fourth possible embodiment of the fourth aspect, in a fifth possible embodiment of the fourth aspect, the UE further includes a measurement unit, the receiving unit is further configured to receive measurement configuration information or demodulation reference signals DMRSs that are sent by the wireless access device and that correspond to the at least two first AI technologies, where the measurement configuration information or the DMRSs are used to instruct the UE to perform radio resource management RRM measurement or channel state information CSI measurement;

the measurement unit, configured to separately perform RRM measurement or CSI measurement corresponding to the at least two first AI technologies according to the measurement configuration information or the DMRSs received by the receiving unit, where the measurement configuration information is carried in the dedicated control information; or, the measurement configuration information is carried in the dedicated system information; or, the measurement configuration information is carried in the RRC reconfiguration message.

With reference to the fourth aspect or any embodiment of the first possible embodiment to the fifth possible embodiment of the fourth aspect, in a sixth possible embodiment of the fourth aspect, the wireless access device is a primary base station, the receiving unit is further configured to receive second resource allocation information sent by the primary base station, where the second resource allocation information is used to indicate at least one second resource allocated on a second carrier by a secondary base station, the at least one second resource is used to transmit the service between the UE and the secondary base station, at least one second AI technology needs to be used to transmit the service between the UE and the secondary base station, the at least one second resource corresponds one by one to the at least one second AI technology, the at least one second AI technology is at least one AI technology of AI technologies supported by the secondary base station, and the primary base station and the secondary base station perform carrier aggregation; and the transmission unit is further configured to use, according to the second resource allocation information received by the receiving unit and on each second resource in the at least one second resource indicated by the second resource allocation information, a second AI technology corresponding to the second resource to transmit the service between the UE and the secondary base station.

With reference to the sixth possible embodiment of the fourth aspect, in a seventh possible embodiment of the fourth aspect, a mapping relationship between the at least two first AI technologies and a data radio bearer DRB established by the primary base station and a mapping relationship between the at least one second AI technology and the DRB are both sent by the primary base station to the UE by using an RRC reconfiguration message.

According to a fifth aspect, an embodiment of the present invention provides a wireless access system. The wireless access system includes:

the foregoing wireless access device according to the third aspect or any possible embodiment of the third aspect, and the foregoing user equipment UE according to the fourth aspect or any possible embodiment of the fourth aspect.

The embodiments of the present invention provide a resource allocation method, an apparatus, and a wireless access system. The method includes: determining, by the wireless access device, the at least two first AI technologies to be used to transmit a service between UE and the wireless access device; allocating, by the wireless access device on the first carrier, at least two first resources that are in a one-to-one correspondence with the at least two first AI technologies, where the at least two first resources are used to transmit the service between the UE and the wireless access device; sending, by the wireless access device, the first resource allocation information to the UE, where the first resource allocation information is used to indicate a first resource corresponding to a first AI technology to be used by UE that receives the first resource allocation information.

Based on the foregoing technical solution, after the wireless access device determines the at least two first AI technologies to be used to transmit the service between the UE and the wireless access device, the wireless access device may simultaneously allocate a first resource to each first AI technology of the at least two first AI technologies separately on a carrier, that is, the first carrier. Therefore, the resource allocation method provided in this embodiment of the present invention may enable, by performing a frequency division manner on the first carrier, the first carrier to simultaneously support the at least two first AI technologies, thereby improving resource utilization and making resource utilization manners more flexible.

BRIEF DESCRIPTION OF DRAWINGS

To describe the technical solutions in the embodiments of the present invention, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
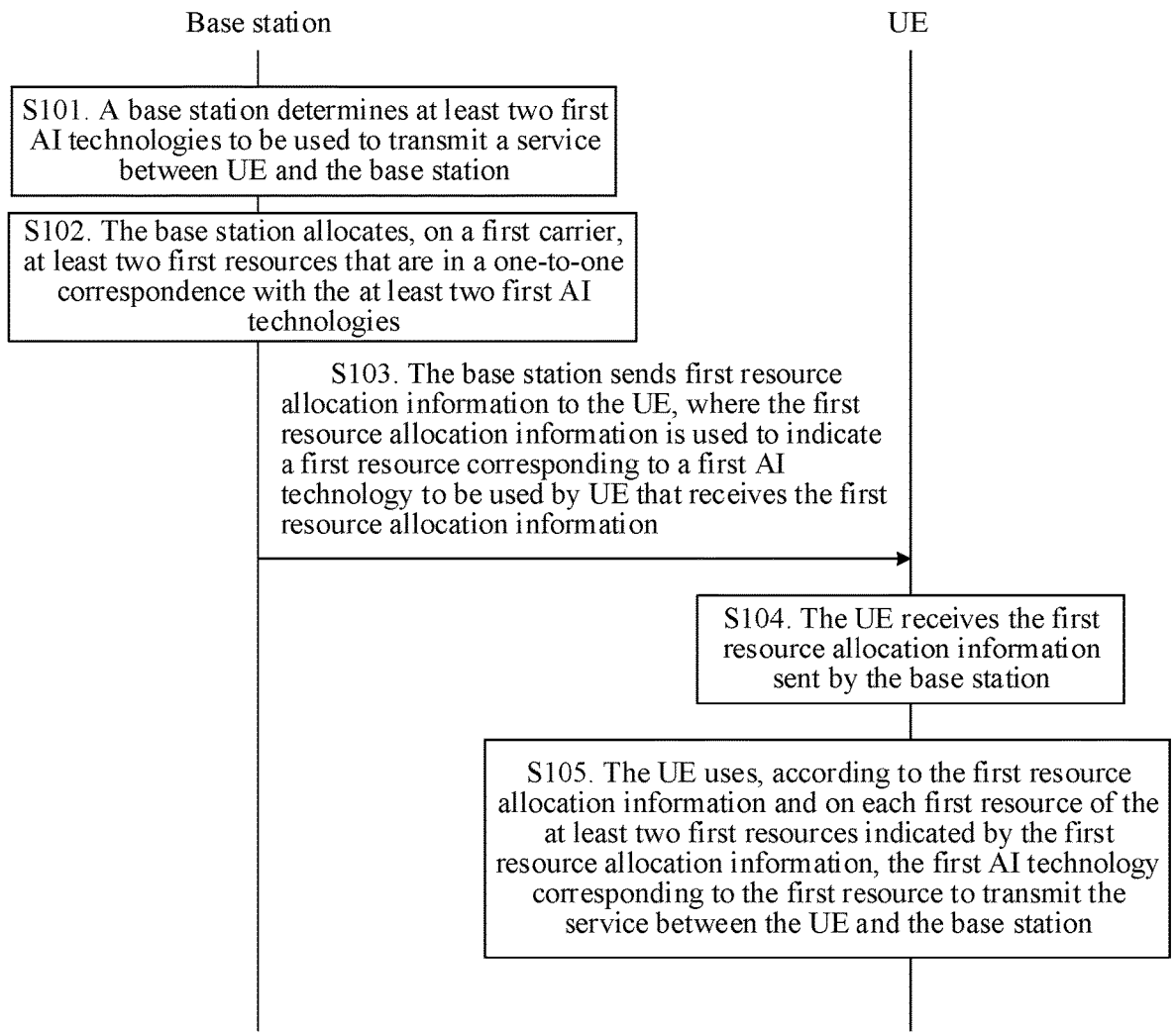
FIG. 1 is an interaction diagram 1 of a resource allocation method according to an embodiment of the present invention.

The term "and/or" in this specification describes only an association relationship for describing associated objects and represents that three relationships may exist. For example, A and/or B may represent the following three cases: Only A exists, both A and B exist, and only B exists. In addition, the character in this specification generally indicates an "or" relationship between the associated objects. For example, AB may be understood as A or B.

In the specification and claims of the present disclosure, the terms "first", "second", "third", "fourth", and so on are intended to distinguish between different objects but do not indicate a particular order of the objects. For example, first resource allocation information and second resource allocation information are intended to distinguish between different resource allocation information but do not indicate a particular order of the resource allocation information.

Unless otherwise indicated, the "multiple" that appears in the specification and claims of the present disclosure means two or more. For example, multiple second subresources are two or more second subresources.

In addition, the terms "including", "including", or any other variant thereof mentioned in descriptions of the embodiments of the present invention, are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

In the following description, specific details such as a particular system structure, an interface, and a technology are set forth in an illustrative but not a restrictive sense to make a thorough understanding of the embodiments of the present invention. However, a person skilled in the art should know that the present invention may be practiced in other embodiments without these specific details. In other cases, detailed descriptions of well-known apparatuses, circuits, and methods are omitted, so that the embodiments of the present invention is described without being obscured by unnecessary details.

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the following embodiments of the present invention, "service" and "data" have similar meanings and may be used interchangeably. For example, transmission of a service between UE and a wireless access device may be understood as transmission of data between the UE and the wireless access device between. Alternatively, transmission of data between UE and a wireless access device may be understood as transmission of a service between the UE and the wireless access device.

In the embodiments of the present invention, the service/data transmitted between the UE and the wireless access device may include signaling and user data, but the present invention is not specifically limited thereto.

A resource allocation method provided in the embodiments of the present invention may be applied to a scenario in which the wireless access device allocates, to the UE, a resource used to transmit a service between the UE and the wireless access device. For example, when the UE needs to transmit uplink data, the UE may first request, from the wireless access device, an uplink resource used to transmit the uplink data. After the wireless access device allocates the uplink resource to the UE, the UE then sends the uplink data to the wireless access device on the uplink resource. Correspondingly, when the wireless access device needs to send downlink data to the UE, the wireless access device may first allocate, to the UE, a downlink resource used to transmit the downlink data. After the wireless access device allocates the downlink resource to the UE, the wireless access device may transmit the downlink data to the UE on the downlink resource.

In the embodiments of the present invention, the wireless access device may be a base station, a distributed base station, a cloud radio access network (CRAN) device, an access network device that includes a radio access network controller and a base station, or the like. The distributed base station or the CRAN device may include a base band unit (BBU) and a remote radio unit (RRU). The CRAN device may further be a CRAN device on a flexible protocol layer. The CRAN device on the flexible protocol layer specifically includes an enhanced BBU and an enhanced RRU. The enhanced BBU and the enhanced RRU may separately have some radio protocol layers or all the radio protocol layers. The radio protocol layer includes a packet data convergence protocol (PDCP) layer, a radio link control (RLC) layer, a media access control (MAC) layer, and a physical layer (PHY). The RRU further includes a radio frequency (RF) part.

The UE may be a wireless terminal. The wireless terminal may be a device that provides a user with voice and/or data connectivity, a handheld device with a wireless connection function, or another processing device connected to a wireless modem. The wireless terminal may communicate with one or more core networks through a radio access network (for example, RAN, Radio Access Network). The wireless terminal may be a mobile terminal, for example, a mobile phone (or referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal is a device such as a personal communication service (PCS) phone, a cordless phone, a session initiate protocol (SIP) phone, a wireless local loop (WLL) station, and a personal digital assistant (PDA). The wireless terminal may alternatively be referred to as a system, a subscriber unit, a subscriber station, a mobile station, a mobile terminal, a remote station, an access point, a remote terminal, an access terminal, a user terminal, a user agent, or user equipment.

To describe more clearly and conveniently the resource allocation method provided in the embodiments of the present invention, in the following method embodiments (Embodiment 1, Embodiment 2, and Embodiment 3), an example in which the wireless access device is a base station is used for description. Certainly, the base station in the following method embodiments may further be replaced with a distributed base station, a CRAN device, an access network device that includes a radio access network controller and a base station, or the like, and is not described again in the embodiments of the present invention.

Embodiment 1

As shown in FIG. 1, an embodiment of the present invention provides a resource allocation method. The resource allocation method may include the following steps.

S101: A base station determines at least two first AI technologies to be used to transmit a service between UE and the base station.

In this embodiment of the present invention, when a service is transmitted between the UE and the base station (including that the base station sends data to the UE and the UE sends data to the base station, where the service/data includes signaling and user data), a first AI technology needs to be used. The first AI technology is alternatively referred to as a radio interface technology (RIT) or a radio interface protocol (RIP). The first AI technology may generally include a multiple access manner, a modulation and coding scheme (MCS), a frame structure, a physical channel (physical channel), a transport channel, a logic channel, media access control (MAC), radio link control (RLC), a packet data convergence protocol (PDCP), radio resource control (RRC), and the like.

The multiple access manner may include a time division multiple access (TDMA) manner, a frequency division multiple access (FDMA) manner, code division multiple access (CDMA), an orthogonal frequency division multiple access (OFDMA) manner, a single carrier-frequency division multiple access (SC-FDMA) manner, and the like.

The frame structure is generally a format of data transmitted on a physical layer and corresponding parameters. Respective specific frame structures are generally used in different wireless communications systems. For example, a frame structure of a 3rd generation partnership project (3GPP) Long Term Evolution technology (LTE) system includes a Type I frame structure used for frequency division multiplexing (FDD) and a Type II frame structure used for time division multiplexing (TDD). The Type I frame structure and the Type II frame structure both include 10 subframes whose length is 1 ms. A major difference between the Type I frame structure and the Type II frame structure lies in that a special subframe is introduced in the Type II frame structure. The special subframe includes three special time slots: a downlink pilot time slot (DwPTS), a guard interval (GP), and an uplink pilot time slot (UpPTS). The DwPTS is always used for downlink data sending, the UpPTS is always used for uplink data sending, and the GP is a guard time interval for downlink-to-uplink conversion. The subframes in the Type I frame structure include an uplink subframe and a downlink subframe according to different frequency ranges. An uplink subframe and a downlink subframe can be simultaneously used in any transmission time interval (TTI). The subframes in the Type II frame structure include an uplink subframe and a downlink subframe. Only an uplink subframe or only a downlink subframe is used in any TTI. A time length of one TTI is equal to a time length of one subframe.

In this embodiment of the present invention, the at least two first AI technologies mean that at least one AI technology of the multiple AI technologies is different from the remaining AI technologies. For example, if at least two frame structures, for example, the Type I frame structure and the Type II frame structure, need to be used to transmit the service between the UE and the base station, it may be considered that the at least two first AI technologies to be used to transmit the service between the UE and the base station. If at least one frame structure and at least one multiple access manner, for example, the Type I frame structure and a CDMA manner, need to be used to transmit the service between the UE and the base station, it may be considered that the at least two first AI technologies to be used to transmit the service between the UE and the base station.

A quantity of UEs is not limited in this embodiment of the present invention. That is, there may be one or more UEs. When there is one UE, the at least two first AI technologies are at least two first AI technologies to be used to transmit the service between the UE and the base station. When there are multiple UEs, the at least two first AI technologies are at least two first AI technologies to be used to transmit services between the multiple UEs and the base station. Further, when there are multiple UEs, each of the multiple UEs may separately use a different first AI technology (for example, each UE uses a first AI technology different from first AI technologies used by other UEs). Alternatively, some of the multiple UEs may use a same first AI technology (for example, some UEs use a first AI technology different from first AI technologies used by other UEs). The embodiments of the present invention are not specifically limited thereto.

Further, in this embodiment of the present invention, one UE may use one first AI technology or multiple first AI technologies to transmit one service. The embodiments of the present invention are not specifically limited thereto.

To describe more clearly the resource allocation method provided in this embodiment of the present invention and specific embodiments of the resource allocation method, in this embodiment of the present invention, one UE is used as an example for description. That is, in this embodiment of the present invention, an example in which one UE needs to use at least two first AI technologies is used for description. It may be understood that when there are multiple UEs, after the base station separately allocates corresponding resources to the multiple UEs, the base station needs to separately indicate, to each UE, a resource allocated to the corresponding UE.

S102: The base station allocates, on a first carrier, at least two first resources that are in a one-to-one correspondence with the at least two first AI technologies.

The at least two first resources are used to transmit the service between the UE and the base station.

After determining the at least two first AI technologies to be used to transmit the service between the UE and the base station, the base station may allocate, on the first carrier, the at least two first resources used to transmit the service between the UE and the base station. The at least two first AI technologies are in a one-to-one correspondence with the at least two first resources. Specifically, the base station may allocate, by using a frequency division manner on the first carrier, one first resource that separately corresponds to each first AI technology. Therefore, the multiple first AI technologies may be simultaneously used on a carrier to transmit the service between the base station and the UE, thereby improving resource utilization and making resource utilization manners more flexible.

It should be noted that, in this embodiment of the present invention, the first resource that is allocated on the first carrier by the base station and that separately corresponds to each first AI technology of the at least two first AI technologies may include a frequency domain resource and a time domain resource. The frequency domain resource may be allocated by using a frequency division manner on the first carrier in this embodiment of the present invention. The time domain resource may be allocated according to a method for allocating a time domain resource in the prior art. This is not limited in the embodiments of the present invention.

The allocation of the time domain resource is the same as that in the prior art. Therefore, for ease of description, for a part in which a time domain resource is not used, for resources, subresources, and the like mentioned in this embodiment of the present invention, a frequency domain resource (or referred to as a frequency range) is used as an example for description.

Figure 2:
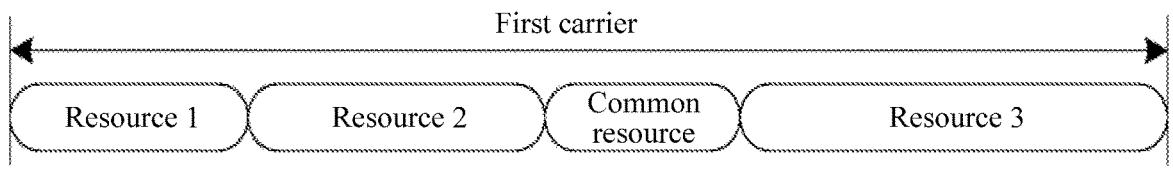
FIG. 2 is a schematic diagram 1 of resource allocation according to an embodiment of the present invention.

For example, FIG. 2 is a schematic diagram of a first resource that is allocated by the base station and that separately corresponds to each first AI technology of the at least two first AI technologies in the resource allocation method according to this embodiment of the present invention. It is assumed that there are three first AI technologies: AI-1, AI-2, and AI-3. As shown in FIG. 2, three first resources that are allocated on the first carrier by the base station and that are in a one-to-one correspondence with AI-1, AI-2, and AI-3 are a resource 1, a resource 2, and a resource 3. The resource 1 is a frequency range separately occupied by AI-1 and a time domain resource occupied by AI-1, the resource 2 is a frequency range separately occupied by AI-2 and a time domain resource occupied by AI-2, and the resource 3 is a frequency range separately occupied by AI-3 and a time domain resource occupied by AI-3. Resources other than the resource 1, the resource 2, and the resource 3 on the first carrier may be common frequency ranges and common time domain resources that can be used by all AI-1, AI-2, and AI-3 (labeled as a common resource in FIG. 2). Optionally, in this embodiment of the present invention, the resource 1, the resource 2, or the resource 3 may alternatively be a common resource that can be used by all AI-1, AI-2, and AI-3.

Optionally, when frequency ranges separately occupied by some first AI technologies of the at least two first AI technologies overlap, in an overlapping frequency range, a time division manner may be used to further perform resource allocation. It is assumed that frequency ranges separately occupied by two first AI technologies overlap, an overlapping frequency range may be separately allocated to the two first AI technologies according to a time division manner, so that a conflict is prevented from occurring between time and frequency resources of the two first AI technologies, and at the same time resource utilization is improved and resource utilization manners become more flexible.

Optionally, in this embodiment of the present invention, after the base station performs frequency division on the first carrier to obtain the at least two first resources, first resources, for example, first frequency ranges, on the first carrier may interfere with each other. To avoid this case, a filter technology may be separately used in the first frequency ranges to filter out a signal that is not in this first frequency range or filter out a leaking signal from this first frequency range.

The filter technology may be filter OFDM, filter bank multiple carrier (FBMC) or generalized frequency division multiplexing (GFDM), and the like.

S103: The base station sends first resource allocation information to the UE, where the first resource allocation information is used to indicate a first resource corresponding to a first AI technology to be used by UE that receives the first resource allocation information.

The base station may allocate resources to multiple UEs that are served by the base station. For example, the base station separately allocates, to the multiple UEs, first resources corresponding to first AI technologies used by the UE. Therefore, the base station separately indicates, to each UE, the first resource allocated to the corresponding UE. One UE is used as an example. The base station sends the first resource allocation information to the UE to indicate, to the UE, the first resource allocated by the base station to the UE. Specifically, in this embodiment of the present invention, the first resource allocation information sent by the base station to the UE may be used to indicate the first resource that is allocated by the base station and that corresponds to the first AI technology to be used by the UE. It may be understood that, in this embodiment of the present invention, if the UE needs to use the at least two first AI technologies, the first resource allocation information may be used to indicate the at least two first resources that are in a one-to-one correspondence with the at least two first AI technologies.

S104: The UE receives the first resource allocation information sent by the base station.

The first resource allocation information is used to indicate the at least two first resources that are allocated on the first carrier by the base station. The at least two first resources are used to transmit the service between the UE and the base station. The at least two first AI technologies to be used to transmit the service between the UE and the base station. The at least two first AI technologies are in a one-to-one correspondence with the at least two first resources.

S105: The UE uses, according to the first resource allocation information and on each first resource of the at least two first resources indicated by the first resource allocation information, the first AI technology corresponding to the first resource to transmit the service between the UE and the base station.

After the base station sends the first resource allocation information to the UE, the UE may receive the first resource allocation information, and the UE transmits a service on the at least two first resources indicated by the first resource allocation information. Specifically, the UE uses, on each first resource of the at least two first resources indicated by the first resource allocation information, the first AI technology corresponding to the first resource to transmit the service between the UE and the base station.

A person skilled in the art may understand that, after the base station allocates, to the UE by using a frequency division manner on the first carrier, the at least two first resources that are in a one-to-one correspondence with the at least two first AI technologies, the UE may separately use, on each first resource of the first carrier according to the indication of the base station, the first AI technology corresponding to the first resource transmit services, so that the at least two first AI technologies can be simultaneously used on one carrier to transmit the service between the UE and the base station, thereby improving resource utilization and making resource utilization manners more flexible.

In the resource allocation method provided in this embodiment of the present invention, after the base station determines the at least two first AI technologies to be used to transmit the service between the UE and the base station, the base station may simultaneously allocate a first resource to each first AI technology of the at least two first AI technologies separately on a carrier, that is, the first carrier. Therefore, the resource allocation method provided in this embodiment of the present invention may enable, by performing a frequency division manner on the first carrier, the first carrier to simultaneously support the at least two first AI technologies, thereby improving resource utilization and making resource utilization manners more flexible.

Figure 3:
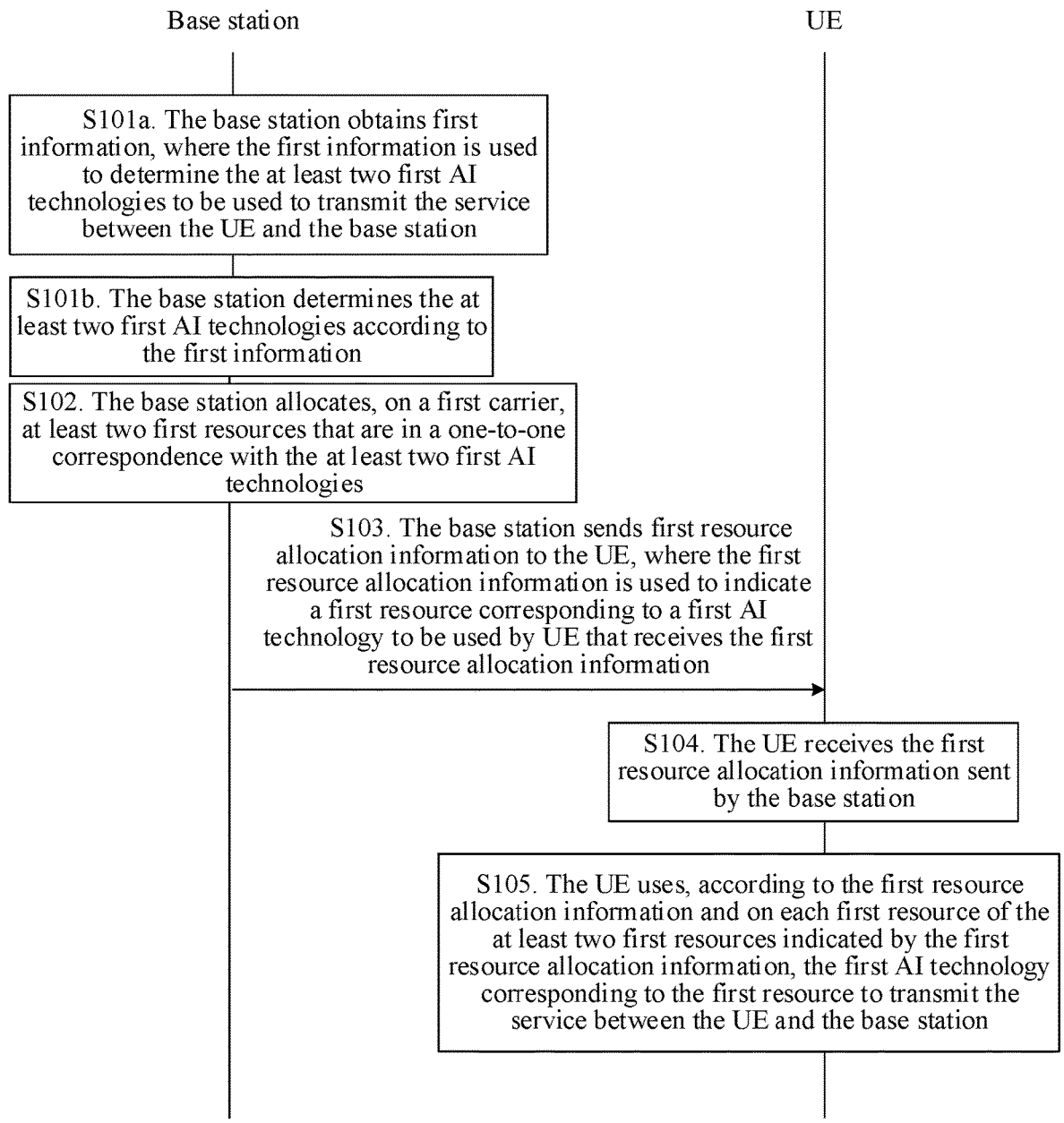
FIG. 3 is an interaction diagram 2 of a resource allocation method according to an embodiment of the present invention.

Optionally, with reference to FIG. 1, as shown in FIG. 3, in the resource allocation method provided in this embodiment of the present invention, the foregoing S101 may specifically include the following steps.

S101*a*: The base station obtains first information, where the first information is used to determine the at least two first AI technologies to be used to transmit the service between the UE and the base station.

S101*b*: The base station determines the at least two first AI technologies according to the first information.

The first information may be an AI technology supported by the base station, or service allocation of the UE. Specifically, if the first information is an AI technology supported by the base station, the base station may determine, according to the AI technology supported by the UE, the at least two first AI technologies that may need to be used to transmit the service between the UE and the base station. If the first information is service allocation of the UE, the base station may determine, according to the service allocation of the UE, the at least two first AI technologies that may need to be used to transmit the service between the UE and the base station. This is not limited in the embodiments of the present invention.

Optionally, in the resource allocation method provided in this embodiment of the present invention, the base station may send the first resource allocation information to the UE in two manners. The two manners are separately described below.

1. The base station sends the first resource allocation information to the UE by using dedicated control information.

Figure 4:
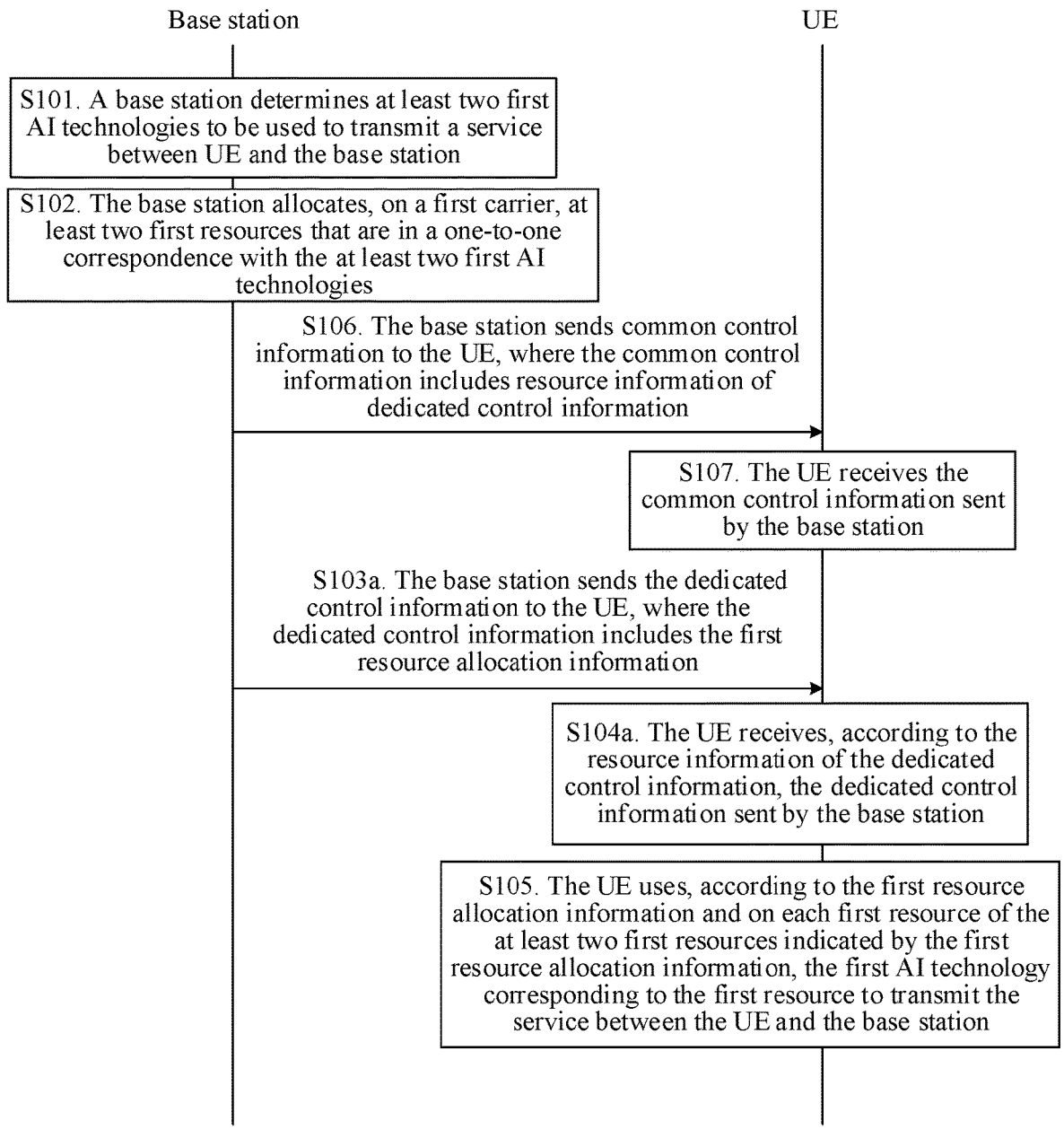
FIG. 4 is an interaction diagram 3 of a resource allocation method according to an embodiment of the present invention.
Figure 5:
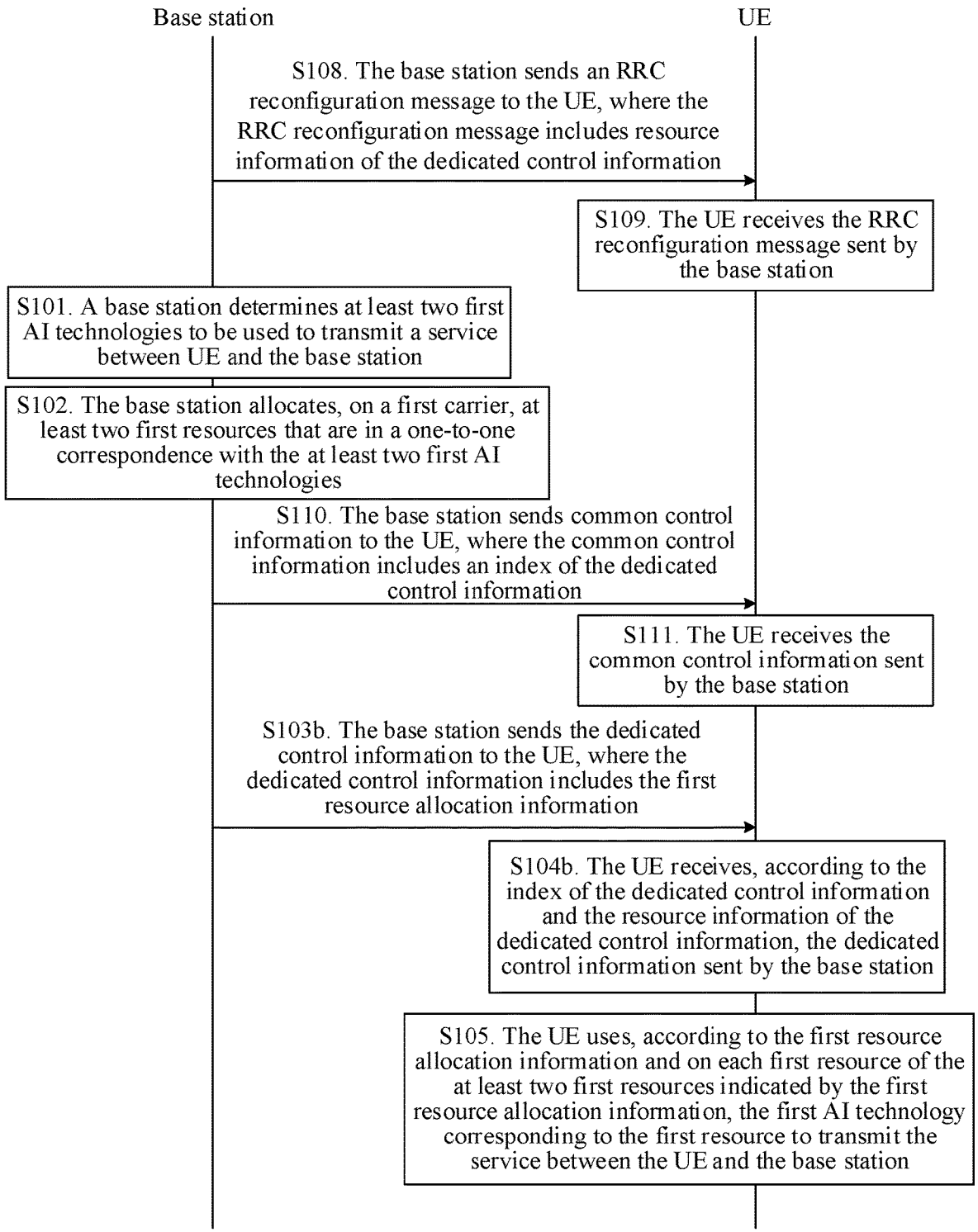
FIG. 5 is an interaction diagram 4 of a resource allocation method according to an embodiment of the present invention.

Optionally, the base station may specifically send the first resource allocation information to the UE by using the dedicated control information and by using the following two embodiments shown in FIG. 4 and FIG. 5.

With reference to FIG. 1, as shown in FIG. 4, in the resource allocation method provided in this embodiment of the present invention, before S103, the resource allocation method may further include the following steps.

S106: The base station sends common control information to the UE, where the common control information includes resource information of dedicated control information.

The resource information of the dedicated control information is used by the UE to receive the dedicated control information. The common control information is control information in a common frequency range of the at least two first AI technologies on the first carrier. The dedicated control information is control information in a frequency range separately occupied on the first carrier by each first AI technology of the at least two first AI technologies.

The common frequency range on the first carrier is a frequency range that can be used by the at least two first AI technologies. The common frequency range is generally used to deliver the common information, for example, general control information and the like of the at least two first AI technologies. The frequency range separately occupied on the first carrier by each first AI technology is a frequency range that can be used by only the first AI technology. The frequency range is generally used for delivering dedicated information of the first AI technology, for example, dedicated control information and the like of the first AI technology.

In this embodiment of the present invention, the base station indicates the resource information of the dedicated control information by using the common control information. Therefore, before sending the dedicated control information to the UE, the base station needs to first send the common control information to the UE. In this way, it may be ensured that the UE accurately obtains the dedicated control information at the location indicated by the resource information of the dedicated control information.

Optionally, the base station may send the common control information to the UE by using a common physical downlink control channel (PDCCH) or a common enhanced PDCCH (EPDCCH). The common PDCCH is a PDCCH in the common frequency range of the at least two first AI technologies on the first carrier. The common EPDCCH is an EPDCCH in the common frequency range of the at least two first AI technologies on the first carrier.

S107: The UE receives the common control information sent by the base station.

After the base station sends the common control information to the UE in the common frequency range, the UE may receive, in the common frequency range, the common control information sent by the base station.

As shown in FIG. 4, the foregoing S103 and S104 may specifically include the following steps.

S103a: The base station sends the dedicated control information to the UE, where the dedicated control information includes the first resource allocation information.

Optionally, the base station may send the dedicated control information to the UE by using dedicated PDCCH or dedicated EPDCCH. The dedicated PDCCH is a PDCCH in the frequency range separately occupied on the first carrier by each first AI technology of the at least two first AI technologies. The dedicated EPDCCH is an EPDCCH in the frequency range separately occupied on the first carrier by each first AI technology of the at least two first AI technologies.

The base station may indicate, to the UE by using the dedicated control information, the first resource corresponding to each first AI technology to be used by the UE, and a validity period (that is, a time during which the UE can use the resource) of the first resource. For example, the base station may indicate, to the UE, TTIs in which each first resource is valid. For example, the first resource is valid in only the TTI or is valid in multiple subsequent TTIs.

It should be noted that, the common control information may be periodically sent. Therefore, an execution sequence of S101 and S102 and S106 is not limited in this embodiment of the present invention. That is, in this embodiment of the present invention, S101 and S102 may be performed before S106 is performed. Alternatively, S106 may be performed before S101 and S102 are performed. Alternatively, S101 and S102 and S106 may be performed at the same time.

In this embodiment of the present invention, an execution sequence of S107 and S103a is not limited. That is, in this embodiment of the present invention, S107 may be performed before S103a is performed. Alternatively, S103a may be performed before S107 is performed. Alternatively, S107 and S103a may be performed at the same time.

S104a: The UE receives, according to the resource information of the dedicated control information, the dedicated control information sent by the base station.

After the base station sends the first resource allocation information to the UE by using the dedicated control information, the UE may determine, according to the common control information received in the common frequency range, the resource information of the dedicated control information, and receive, according to the resource information of the dedicated control information, the dedicated control information sent by the base station.

Specifically, the UE may determine, according to the resource information of the dedicated control information, a start location of resource element groups (REG)/control channel elements (CCE) occupied by the dedicated control information and a quantity of the REGs/CCEs occupied by the dedicated control information. Therefore, the UE may start from the start location to sequentially read information in these REGs/CCEs and obtain the dedicated control information, and obtain the first resource allocation information from the dedicated control information. The dedicated control information may include the first resource allocation information and indicate information used to indicate the first resource allocation information. Specifically, the indicate information is used to indicate that the first resource allocation information exists in the dedicated control information and indicates a start location of REGs/CCEs occupied by the first resource allocation information in the dedicated control information and a quantity of the REG/CCEs occupied by the first resource allocation information in the dedicated control information.

It should be noted that, the common control information and the dedicated control information may have different frame structures. Therefore, after obtaining the resource information of the dedicated control information from the common control information, the UE needs to convert the resource information of the dedicated control information (first resource information of the dedicated control information) before the UE can obtain the resource information of the accurate dedicated control information (second resource information of the dedicated control information). For example, in the resource allocation method provided in this embodiment of the present invention, one of the following methods may be used to convert the first resource information of the dedicated control information to obtain the second resource information of the dedicated control information:

a. The base station configures or prespecifies, for the UE, a subcarrier interval corresponding to each first AI technology of the at least two first AI technologies used by the UE. The UE converts the first resource information of the dedicated control information according to the subcarrier interval corresponding to each first AI technology to obtain the second resource information of the dedicated control information (including the start location of the REGs/CCEs occupied by the accurate dedicated control information and a quantity of the REGs/CCEs occupied by the accurate dedicated control information).

Specifically, corresponding to each first AI technology, the UE may separately calculate second resource information of dedicated control information for the first AI technology. Details are not described again in this embodiment of the present invention.

b. The base station converts the first resource information of the dedicated control information according to the subcarrier interval corresponding to each first AI technology of the at least two first AI technologies to obtain a quantity of REGs/CCEs occupied by the accurate dedicated control information, and sends the quantity of the REGs/CCEs occupied by the accurate dedicated control information to the UE. The UE converts the first resource information of the dedicated control information according to the subcarrier interval corresponding to each first AI technology to obtain the start location of the REGs/CCEs occupied by the accurate dedicated control information.

Certainly, the foregoing two manners a and b are description of only examples of the method for converting the first resource information of the dedicated control information to obtain the second resource information of the dedicated control information in this embodiment of the present invention. This embodiment of the present invention includes, but is not limited to, the foregoing two manners. Any other method that can implement conversion of the first resource information of the dedicated control information to obtain the second resource information of the dedicated control information in this embodiment of the present invention falls within the protection scope of the present invention.

Optionally, in this embodiment of the present invention, the base station may send the common control information and the dedicated control information to the UE in a same TTI; or may send the common control information and the dedicated control information to the UE in different TTIs. This is not specifically limited in the embodiments of the present invention.

Optionally, with reference to FIG. 1, as shown in FIG. 5, in the resource allocation method provided in this embodiment of the present invention, before S101, the resource allocation method may further include the following steps.

S108: The base station sends an RRC reconfiguration message to the UE, where the RRC reconfiguration message includes resource information of the dedicated control information.

The resource information of the dedicated control information includes a resource location of the dedicated control information and an index of the dedicated control information, and the dedicated control information is control information in a frequency range separately occupied on the first carrier by each first AI technology of the at least two first AI technologies.

S109: The UE receives the RRC reconfiguration message sent by the base station.

After an RRC link is established between the base station and the UE, the base station sends the RRC reconfiguration message to the UE, where the RRC reconfiguration message is used to reconfigure the RRC link.

As shown in FIG. 5, before S103, the resource allocation method provided in this embodiment of the present invention may further include the following steps.

S110: The base station sends common control information to the UE, where the common control information includes an index of the dedicated control information.

The index of the dedicated control information and the resource information of the dedicated control information are used by the UE to receive the dedicated control information. The common control information is control information in the common frequency range of the at least two first AI technologies on the first carrier.

Optionally, the base station may send the common control information to the UE by using a common PDCCH or a common EPDCCH. For details, refer to the foregoing related description of the embodiment shown in FIG. 4. Details are not described here again.

It should be noted that, the common control information may be periodically sent. Therefore, an execution sequence of S101 and S102 and S110 is not limited in this embodiment of the present invention. That is, in this embodiment of the present invention, S101 and S102 may be performed before S110 is performed. Alternatively, S110 may be performed before S101 and S102 are performed. Alternatively, S101 and S102 and S110 may be performed at the same time.

S111: The UE receives the common control information sent by the base station.

After receiving the common control information sent by the base station, the UE obtains the index of the dedicated control information from the common control information.

As shown in FIG. 5, the foregoing S103 and S104 may specifically include the following steps.

S103b: The base station sends the dedicated control information to the UE, where the dedicated control information includes the first resource allocation information.

Optionally, the base station may send the dedicated control information to the UE by using dedicated PDCCH or dedicated EPDCCH. For details, refer to the foregoing related description of the embodiment shown in FIG. 4. Details are not described here again.

It should be noted that, an execution sequence of S111 and S103b is not limited in this embodiment of the present invention. That is, in this embodiment of the present invention, S111 may be performed before S103b is performed. Alternatively, S103b may be performed before S111 is performed. Alternatively, S111 and S103b may be performed at the same time.

S104b: The UE receives, according to the index of the dedicated control information and the resource information of the dedicated control information, the dedicated control information sent by the base station.

After obtaining the index of the dedicated control information (first index) from the common control information, the UE may find, according to the first index and from the resource information of the dedicated control information included in the RRC reconfiguration message, an index that is the same as the first index, and determine a resource location of the dedicated control information corresponding to the index. Therefore, the UE may determine, according to the resource location, a resource location of the dedicated control information, that is, a sequence number of the REG/CCE occupied by the dedicated control information. In this way, the UE may receive, at a resource location of the dedicated control information, the dedicated control information sent by the base station.

Optionally, in this embodiment of the present invention, the base station may send the common control information and the dedicated control information to the UE in a same TTI; or may send the common control information and the dedicated control information to the UE in different TTIs. This is not specifically limited in the embodiments of the present invention.

2. The base station sends the first resource allocation information to the UE by using control information.

The control information in this embodiment may be the same as the control information in the prior art.

Figure 6:
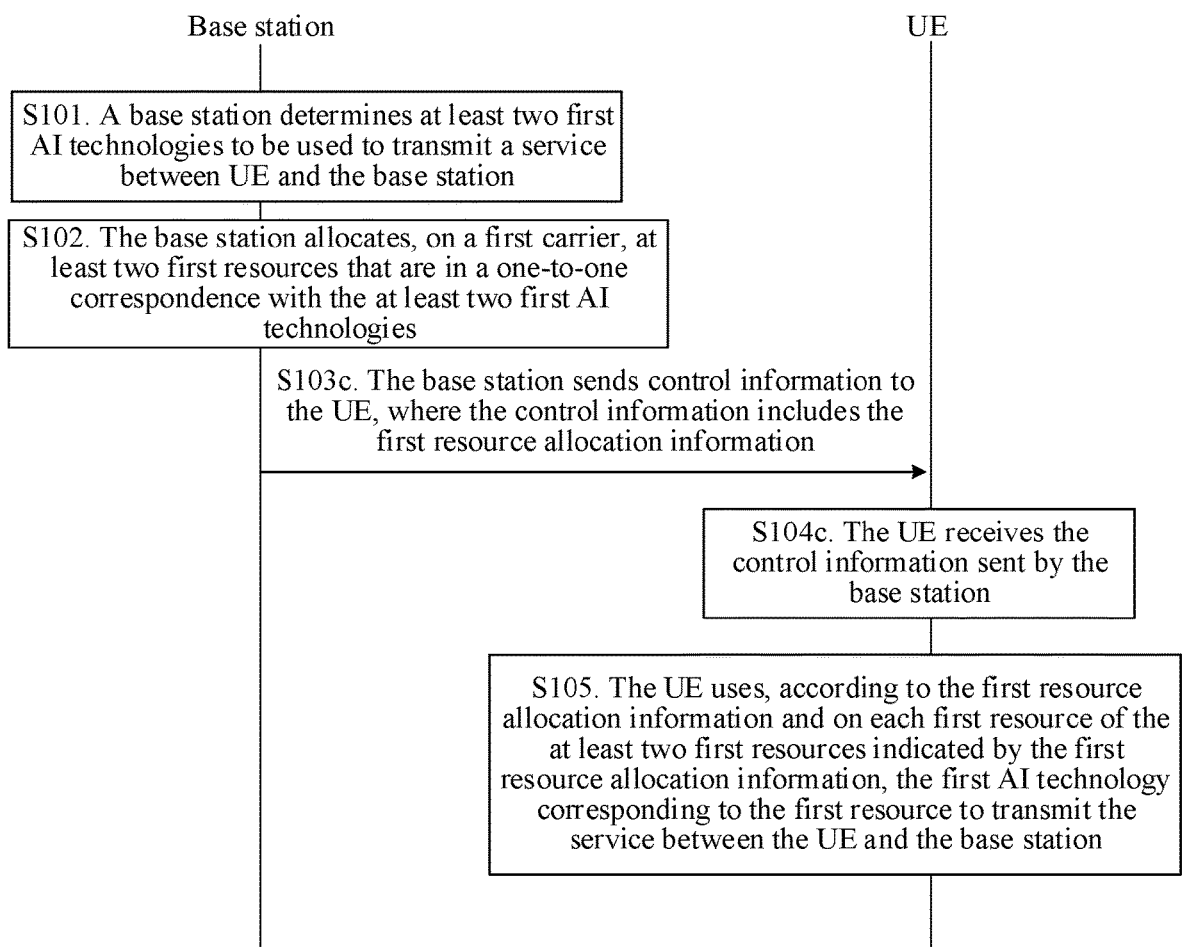
FIG. 6 is an interaction diagram 5 of a resource allocation method according to an embodiment of the present invention.

With reference to FIG. 1, as shown in FIG. 6, in the resource allocation method provided in this embodiment of the present invention, the foregoing S103 and S104 may specifically include the following steps.

S103c: The base station sends control information to the UE, where the control information includes the first resource allocation information.

Optionally, the base station may send the control information to the UE by using a PDCCH or an EPDCCH. The PDCCH, the EPDCCH, and the control information are all similar to a PDCCH, an EPDCCH, and control information in the prior art. Details are not described here again.

S104c: The UE receives the control information sent by the base station.

After receiving the control information sent by the base station, the UE may obtain the first resource allocation information from the control information.

Figure 7:
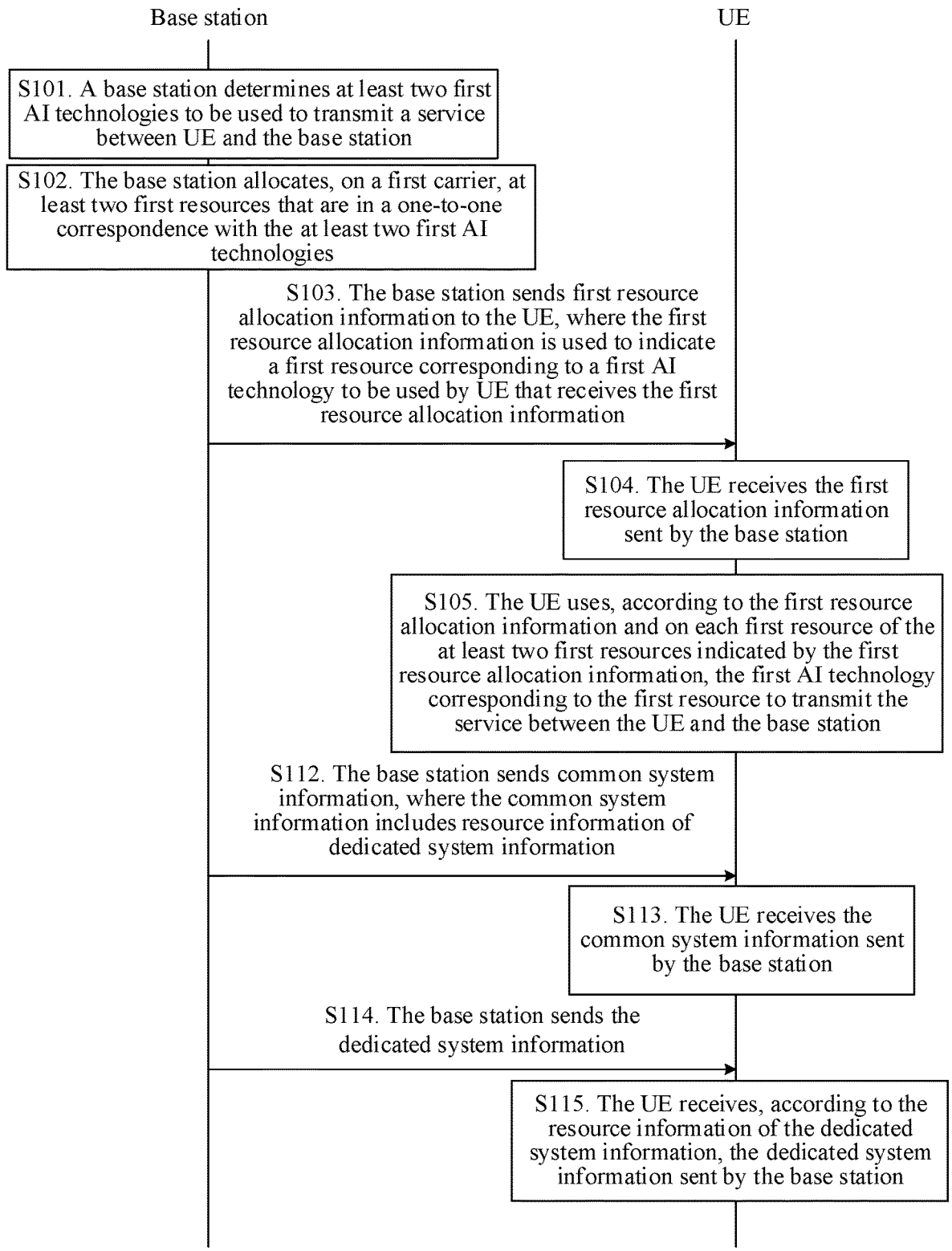
FIG. 7 is an interaction diagram 6 of a resource allocation method according to an embodiment of the present invention.

Optionally, with reference to FIG. 1, as shown in FIG. 7, the resource allocation method provided in this embodiment of the present invention may further include the following steps.

S112: The base station sends common system information, where the common system information includes resource information of dedicated system information.

The resource information of the dedicated system information is used by the UE to receive the dedicated system information. The common system information is system information in the common frequency range of the at least two first AI technologies on the first carrier. The dedicated system information is system information in the frequency range separately occupied on the first carrier by each first AI technology of the at least two first AI technologies.

In this embodiment of the present invention, as the at least two first AI technologies are simultaneously used on the first carrier, the system information may include the common system information and the dedicated system information. The common system information may be used to indicate the resource information of the dedicated system information. The resource information of the dedicated system information includes time and frequency resource information of the dedicated system information.

Specifically, the base station may broadcast the common system information. In this way, all UEs that are in the coverage range of the base station can receive the common system information.

S113: The UE receives the common system information sent by the base station.

The UE may detect the common system information from the common frequency range, and accesses the base station according to access resource information indicated by the common system information.

S114: The base station sends the dedicated system information.

Specifically, the base station may broadcast the dedicated system information. In this way, all UEs that are in the coverage range of the base station can receive the dedicated system information.

It should be noted that, an execution sequence of S113 and S114 is not limited in this embodiment of the present invention. That is, in this embodiment of the present invention, S113 may be performed before S114 is performed. Alternatively, S114 may be performed before S113 is performed. Alternatively, S113 and S114 may be performed at the same time.

S115: The UE receives, according to the resource information of the dedicated system information, the dedicated system information sent by the base station.

After obtaining the resource information of the dedicated system information from the common system information, the UE may receive, according to the resource information of the dedicated system information, the dedicated system information sent by the base station. For example, from the UEs, each UE may obtain, from the common system information, only the resource information of the dedicated system information corresponding to the first AI technology to be used by the UE, and receive, according to the resource information of the dedicated system information, the dedicated system information.

It should be noted that, the common system information and the dedicated system information may have different frame structures. Therefore, after obtaining the resource information of the dedicated system information from the common system information, the UE needs to convert the resource information of the dedicated system information (first resource information of the dedicated system information) before the UE can obtain resource information of accurate dedicated system information (second resource information of the dedicated system information). Specifically, for the method for converting the first resource information of the dedicated system information to obtain the second resource information of the dedicated system information, refer to the example of the method for converting the first resource information of the dedicated control information to obtain the second resource information of the dedicated control information in the foregoing embodiment shown in FIG. 4. Details are not described here again.

In this embodiment of the present invention, both the common system information and the dedicated system information are periodically broadcast by the base station. Therefore, S112 to S115 shown in FIG. 7 may be performed periodically. An execution sequence of S101 to S105 and S112 to S115 is not limited in this embodiment of the present invention. That is, in this embodiment of the present invention, S101 to S105 may be performed before S112 to S115 are performed. Alternatively, S112 to S115 may be performed before S101 to S105 are performed. Alternatively, S101 to S105 and S112 to S115 may be performed at the same time.

Optionally, in this embodiment of the present invention, after the UE accesses the base station according to the access resource information indicated by the common system information received by the UE, the base station may send the RRC reconfiguration message to the UE. The RRC reconfiguration message is used to configure a mapping relationship between a data radio bearer (DRB) and a first AI technology. For example, different DRBs are mapped to different first AI technologies, or multiple DRBs are mapped to a same first AI technology. Each first AI technology has an independent MAC layer entity. Alternatively, multiple first AI technologies are grouped, multiple first AI technologies in one group share one MAC layer entity, and first AI technologies in different groups use different MAC layer entities. MAC layer entities of various first AI technologies may further be mapped to corresponding physical layer entities, so that specific physical layer technologies of various first AI technologies can be used. For example, a DRB of a machine to machine (M2M) service that requires an ultra low delay is mapped to a first AI technology corresponding to M2M that requires an ultra low delay; a DRB of a mobile broadband unicast service is mapped to a first AI technology of a Long Term Evolution (LTE) system; and the like. For a mapping method between a signaling radio bearer (SRB) and a first AI technology, refer to the mapping method between the DRB and the first AI technology. Details are not described here again. It may be understood that, during actual application, for ease of embodiment, all SRBs may be mapped to a same first AI technology.

Based on the mapping relationships between entities, a transport channel is located between a MAC layer and a physical layer, and a physical channel is located in a physical layer. Therefore, the mapping between the transport channel and the physical channel may be implemented by using the following manners:

(1) Each first AI technology or each first AI technology group (including multiple first AI technologies) separately has one downlink shared transport channel and one uplink shared transport channel. The downlink shared transport channel of each first AI technology/each first AI technology group is mapped to a physical downlink shared channel of the first AI technology/the first AI technology group. The uplink shared transport channel of each first AI technology/ each first AI technology group is mapped to a physical uplink shared channel of the first AI technology/the first AI technology group.

(2) One downlink shared transport channel may be mapped to physical downlink shared channels of multiple first AI technologies or multiple first AI technology groups. One uplink shared transport channel may be mapped to physical uplink shared channels of multiple first AI technologies or multiple first AI technology groups. The MAC layer entity dynamically determines, according to the scheduling information, physical channels of which AI technology/technologies or which AI technology group/groups the transport channel is to be mapped to.

Figure 8:
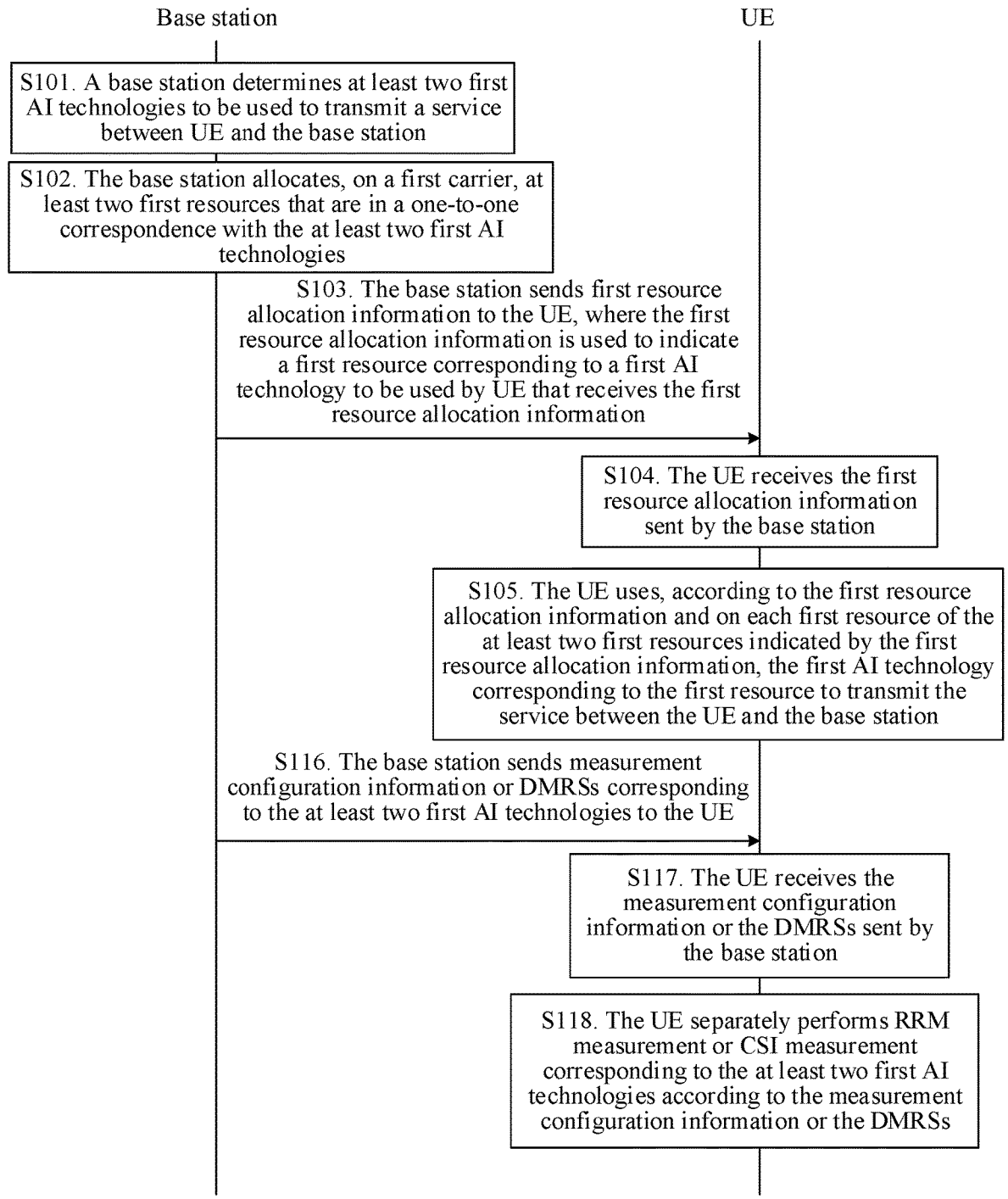
FIG. 8 is an interaction diagram 7 of a resource allocation method according to an embodiment of the present invention.

Optionally, with reference to FIG. 1, as shown in FIG. 8, the resource allocation method provided in this embodiment of the present invention may further include the following steps.

S116: The base station sends measurement configuration information or demodulation reference signals (DMRS) corresponding to the at least two first AI technologies to the UE.

The measurement configuration information or the DMRSs are used to instruct the UE to perform radio resource management (RRM) measurement or channel state information (CSI) measurement.

The measurement configuration information may be carried in the dedicated control information sent by the base station to the UE. Alternatively, the measurement configuration information may be carried in the dedicated system information sent by the base station. Alternatively, the measurement configuration information may further be carried in the RRC reconfiguration message. Specifically, the selection may be made according to an actual use requirement. This is not limited in the embodiments of the present invention described herein.

In this embodiment of the present invention, the measurement configuration information corresponding to the at least two first AI technologies may be universal measurement configuration information that corresponds to all first AI technologies, or may be at least two separate pieces of measurement configuration information that are in a one-to-one correspondence with each first AI technology. This is not specifically limited in the embodiments of the present invention.

The DMRSs that correspond to the at least two first AI technologies are at least two DMRSs that are in a one-to-one correspondence with each first AI technology.

Optionally, the measurement configuration information may include measurement parameters such as a measurement trigger event, a measurement period, a measurement bandwidth, and measurement frequency of RRM measurement or CSI measurement performed by the UE. Alternatively, the measurement configuration information may include measurement parameters such as a measurement subframe, a measurement bandwidth, and measurement frequency of RRM measurement or CSI measurement performed by the UE.

Certainly, the measurement configuration information in this embodiment of the present invention includes, but is not limited to, several measurement parameters listed in the foregoing. Other related measurement parameters of the RRM measurement or CSI measurement performed by the UE fall within the protection scope of the embodiments of the present invention.

For example, among the several measurement parameters listed in the foregoing, the base station may indicate, to the UE by using the dedicated control information/the dedicated system information, a measurement bandwidth and measurement frequency of RRM measurement or CSI measurement performed within a period of time, and indicate, to the UE by using the RRC reconfiguration message, a measurement trigger event and a measurement period, so that the UE may perform the RRM measurement or the CSI measurement based on these measurement parameters. The base station may further configure some measurement subframes, measurement bandwidths, and measurement frequency for the UE by using the dedicated control information/the dedicated system information/the RRC reconfiguration message. In this way, in these measurement subframes, the UE may perform RRM measurement or CSI measurement based on these measurement bandwidths and measurement frequency.

It should be noted that, the RRM measurement or CSI measurement performed by the UE is measurement based on each first AI technology. Specifically, the base station may configure, for the UE, universal measurement configuration information that corresponds to all first AI technologies or at least two separate pieces of measurement configuration information that separately correspond to each first AI technology. In this way, the UE may separately perform RRM measurement or CSI measurement for each first AI technology based on the configuration information.

S117: The UE receives the measurement configuration information or the DMRSs sent by the base station.

S118: The UE separately performs RRM measurement or CSI measurement corresponding to the at least two first AI technologies according to the measurement configuration information or the DMRSs.

After receiving the measurement configuration information or the DMRSs sent by the base station, the UE may separately perform RRM measurement or CSI measurement for each first AI technology according to the measurement configuration information or the DMRSs.

It should be noted that, in this embodiment of the present invention, when the UE performs RRM measurement or CSI measurement by using the DMRSs, the base station may instruct the UE to directly perform RRM measurement or CSI measurement after receiving the DMRSs, but does not need to send the measurement configuration information to the UE.

Specifically, in this embodiment of the present invention, an execution sequence of S116 to S118 may be determined according to a specific sending process (which may be aperiodic sending or periodic sending) of the measurement configuration information and the DMRSs. In FIG. 8 in this embodiment, only an example in which S116 to S118 are performed after S101 to S105 are performed is used for description.

Figure 9:
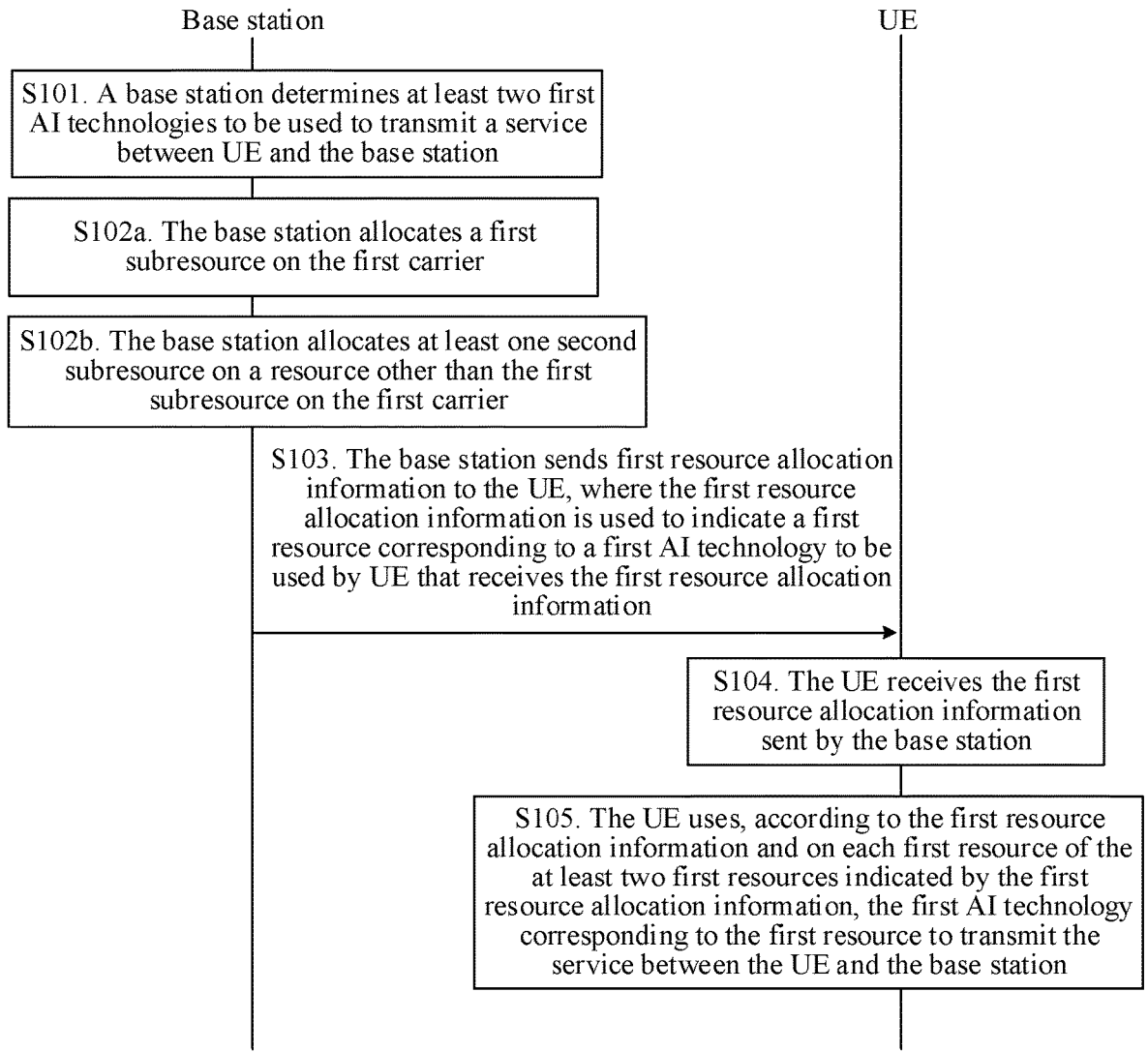
FIG. 9 is an interaction diagram 8 of a resource allocation method according to an embodiment of the present invention.

Optionally, in this embodiment of the present invention, the at least two first AI technologies include a first sub-AI technology and at least one second sub-AI technology. The at least two first resources include a first subresource corresponding to the first sub-AI technology and at least one second subresource that corresponds one by one to the at least one second sub-AI technology. With reference to FIG. 1, as shown in FIG. 9, in the resource allocation method provided in this embodiment of the present invention, the foregoing S102 may specifically include the following steps.

S102a: The base station allocates the first subresource on the first carrier.

S102b: The base station allocates the at least one second subresource on a resource other than the first subresource on the first carrier.

A bandwidth of the first subresource and a bandwidth of each second subresource of the at least one second subresource are both less than a bandwidth of the first carrier.

In this embodiment of the present invention, when the at least one second subresource is multiple second subresources, frequency ranges occupied on the first carrier by the multiple second subresources may overlap or may not overlap. Alternatively, among the multiple second subresources, frequency ranges occupied on the first carrier by some second subresources overlap, and frequency ranges occupied on the first carrier by some other second subresources do not overlap.

When frequency ranges occupied on the first carrier by two second subresources overlap, service transmission may further be performed in an overlapping frequency range by using a time division manner and by using first AI technologies separately corresponding to the two second subresources.

Figure 10:
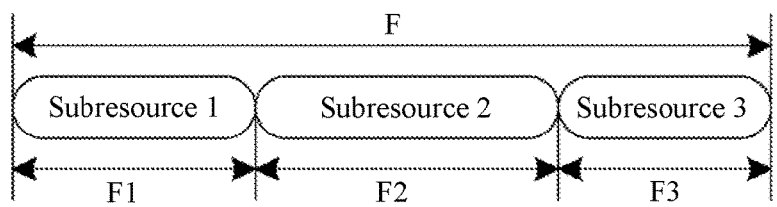
FIG. 10 is a schematic diagram 2 of resource allocation according to an embodiment of the present invention.

For example, it is assumed that there are three first AI technologies: AI-1 (a second sub-AI technology), AI-2 (a second sub-AI technology), and AI-3 (a first sub-AI technology). The base station separately allocates, on the first carrier, first resources corresponding to the three first AI technologies, which are respectively marked as: a subresource 1 corresponding to AI-1, a subresource 2 corresponding to AI-2, and a subresource 3 corresponding to AI-3. As shown in FIG. 10, it is assumed that a bandwidth of the first carrier is F, a bandwidth of the subresource 1 is F1, a bandwidth of the subresource 2 is F2, and a bandwidth of the subresource 3 is F3. F1, F2, and F3 are all less than F.

Figure 11:
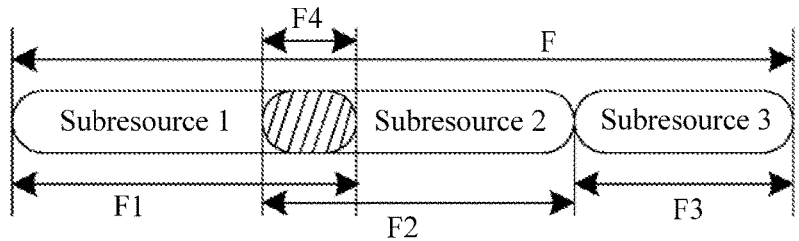
FIG. 11 is a schematic diagram 3 of resource allocation according to an embodiment of the present invention.

In FIG. 10, an example in which frequency ranges occupied on the first carrier by the subresource 1, the subresource 2, and the subresource 3 do not overlap is used for description. That is, the UE uses the subresource 1, the subresource 2, and the subresource 3 on the first carrier by using only a frequency division manner. As shown in FIG. 11, frequency ranges occupied on the first carrier by the subresource 1 and the subresource 2 partially overlap (a shadowed part in FIG. 11). Frequency ranges occupied on the first carrier by the subresource 1 and the subresource 3 do not overlap. Frequency ranges occupied on the first carrier by the subresource 2 and the subresource 3 do not overlap. It is assumed that the overlapping part of the frequency ranges occupied on the first carrier by the subresource 1 and the subresource 2 is marked as F4. F4 may further be used by using a frequency division manner. That is, the UE uses the subresource 1, the subresource 2, and the subresource 3 on the first carrier in a manner that combines frequency division and time division.

Figure 12:
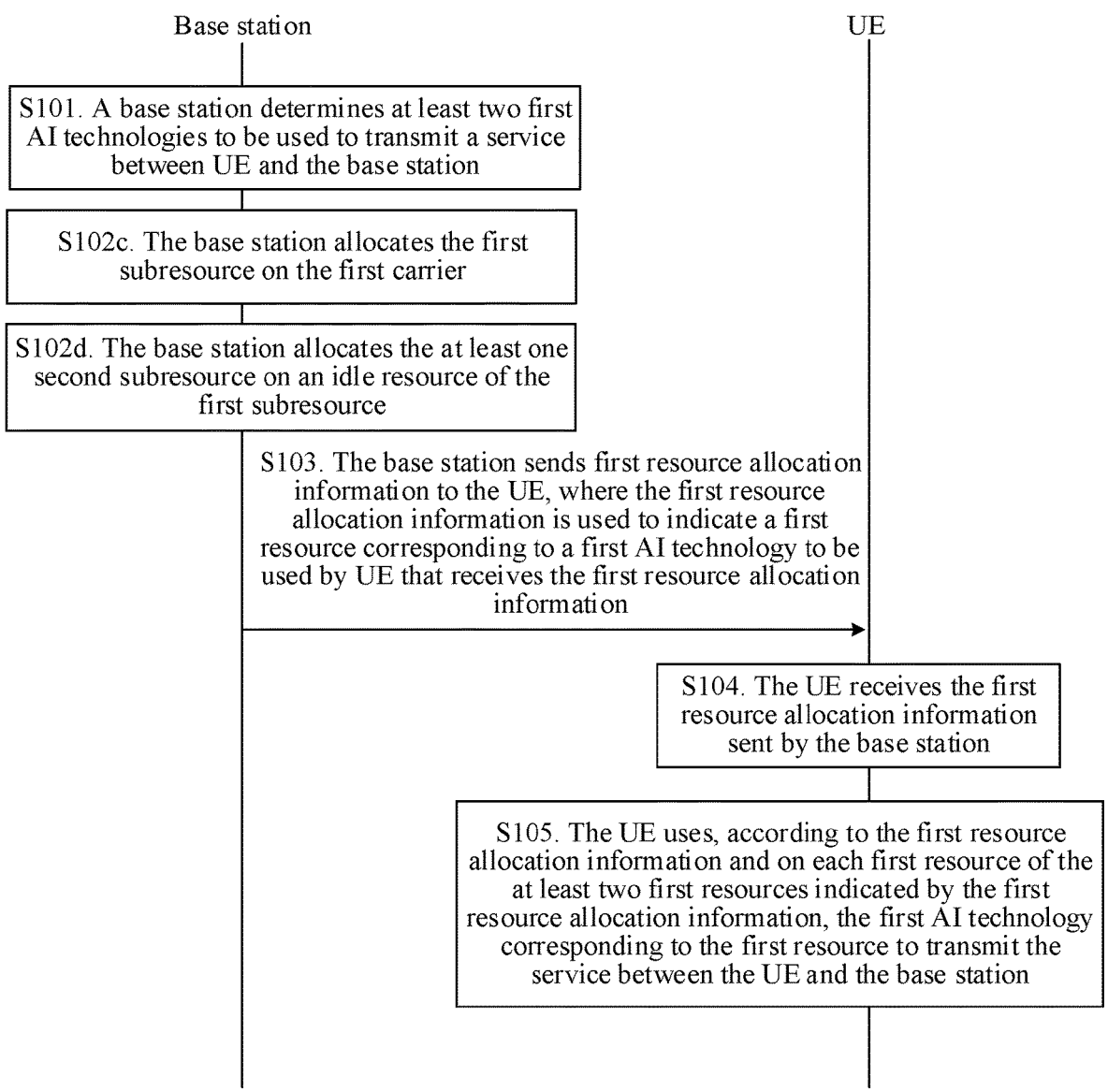
FIG. 12 is an interaction diagram 9 of a resource allocation method according to an embodiment of the present invention.

Optionally, in this embodiment of the present invention, the at least two first AI technologies include a first sub-AI technology and at least one second sub-AI technology. The at least two first resources include a first subresource corresponding to the first sub-AI technology and the at least one second subresource that corresponds one by one to the at least one second sub-AI technology. With reference to FIG. 1, as shown in FIG. 12, in the resource allocation method provided in this embodiment of the present invention, the foregoing S102 may specifically include the following steps.

S102c: The base station allocates the first subresource on the first carrier.

S102d: The base station allocates the at least one second subresource on an idle resource of the first subresource.

A bandwidth of each second subresource of the at least one second subresource is less than a bandwidth of the first subresource.

In this embodiment, the base station may allocate a part or all of a bandwidth of the first carrier to the first AI technology, for example, the first sub-AI technology, of the at least two first AI technologies. That is, the first subresource may be a part of the bandwidth of the first carrier or all of the bandwidth of the first carrier. Then, during actual service transmission, the first sub-AI technology may occupy only a part of the resource on the first subresource. Therefore, on the idle resource of the first subresource, the base station may further separately allocate a second subresource to each second sub-AI technology of the at least one second sub-AI technologies.

When the at least one second subresource is multiple second subresources, frequency ranges occupied on the idle resource of the first subresource by the multiple second subresources may overlap or may not overlap. Alternatively, among the multiple second subresources, frequency ranges occupied on the idle resource of the first subresource by some second subresources overlap, and frequency ranges occupied on the idle resource of the first subresource by some other second subresources do not overlap.

When frequency ranges occupied on the idle resource of the first subresource by two second subresources overlap, service transmission may further be performed in an overlapping frequency range by using a time division manner and by using the first AI technologies separately corresponding to the two second subresources.

Specifically, for the description of that frequency ranges occupied on an idle resource of the first subresource by the two second subresources overlap or do not overlap, refer to the related description of the foregoing embodiments shown in FIG. 9 to FIG. 11. Details are not described here again.

For example, after the base station allocates, to the UE, the first subresource corresponding to the first sub-AI technology of the at least two first AI technologies, when the base station then allocates, on the idle resource of the first subresource to the UE, second subresources separately corresponding to the at least one second sub-AI technology of the at least two first AI technologies, puncturing processing and rate matching processing need to be performed on a common signal in the first subresource, so as to skip an OFDM symbol and a frequency range that are occupied by a PDCCH and a cell reference signal (CRS) of the first subresource. That is, the base station needs to perform the foregoing special processing on the first subresource occupied by a PDCCH and a CRS of the first sub-AI technology.

For example, it is assumed that the PDCCH of the first sub-AI technology occupies the full bandwidth or partial bandwidth of the first carrier. A hybrid automatic repeat request (HARQ) of a second sub-AI technology other than the first sub-AI technology of the at least two first AI technologies needs to skip two OFDM symbols (assumed to be 0.1 ms) of the PDCCH. The method may be applied to temporary use of the second sub-AI technology to transmit a service in some TTIs of the first sub-AI technology. For example, the base station may send, to the UE, the RRC reconfiguration message related to the second sub-AI technology. In this way, multiple first AI technologies are simultaneously used on the first carrier, so that a transmission delay can be reduced.

Figure 13:
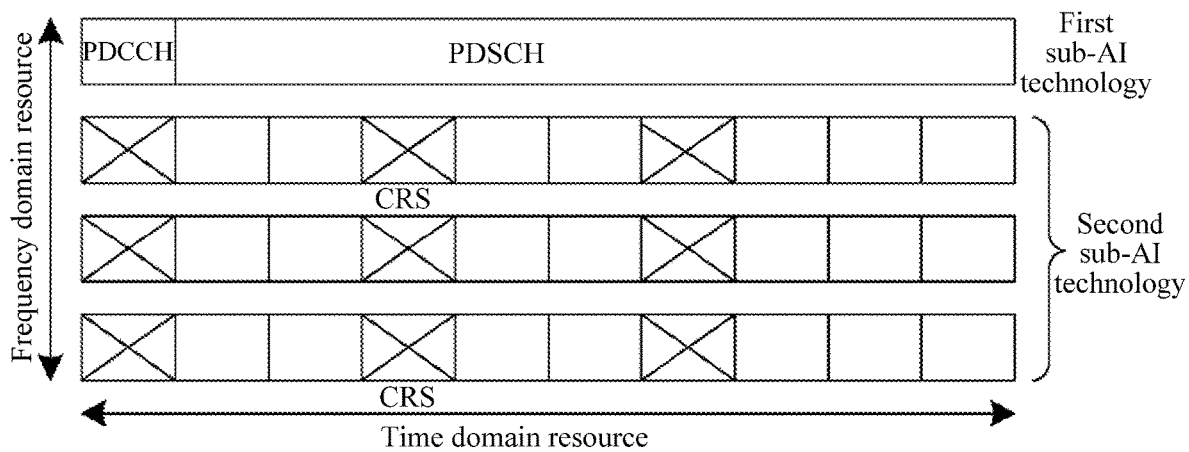
FIG. 13 is a schematic diagram 4 of resource allocation according to an embodiment of the present invention.

Further, for HARQ processing of the second sub-AI technology, during calculation of a HARQ round trip time (RTT), for frequency ranges corresponding to a PDCCH and a CRS of the first sub-AI technology, time lengths occupied by symbols of the PDCCH and the CRS are skipped in the time domain. As shown in FIG. 13, in a frequency range occupied by the first sub-AI technology, a part of the frequency range is reserved for the second sub-AI technology. For example, the location of "X" in FIG. 13 represents OFDM symbols occupied by the PDCCH and the CRS in a subframe of the first sub-AI technology. These OFDM symbols are common information, and conventional UE still needs to detect these information. Therefore, setting and sending are still performed according to the parameters of the first sub-AI technology. When the base station allocates, to the UE, the second subresource corresponding to the second sub-AI technology and calculates a HARQ RTT, the base station needs to avoid the location of "X" in FIG. 13. Optionally, in this embodiment of the present invention, resource allocation may be performed according to the foregoing method in a TTI or multiple consecutive or nonconsecutive TTIs.

In this embodiment of the present invention, the foregoing resource allocation method shown in FIG. 12 may be applied to sending of RRC signaling (for example, the RRC reconfiguration message). For example, the RRC signaling is considered as a type of special services, and is sent by using AI-2. In a possible application scenario, for example, a base station A and a base station B are configured for the UE to perform carrier aggregation. A cell served by the base station A is an LTE cell, and a cell served by the base station B is a millimeter wave cell. The UE establishes dual connectivity (DC) with the base station A and the base station B. The base station A sends the RRC signaling to the UE by using an LTE cell and by using AI-1, or the base station A and the base station B coordinate to send the RRC signaling to the UE (the base station A and the base station B may simultaneously send the RRC signaling to the UE or separately send the RRC signaling to the UE). The base station A may need to send the RRC signaling to the UE in only some subframes. Therefore, in this embodiment, AI-2 is used on a part of the time and frequency resources of AI-1 to send the RRC signaling to the UE, so that a delay of the RRC signaling can be reduced.

Figure 14:
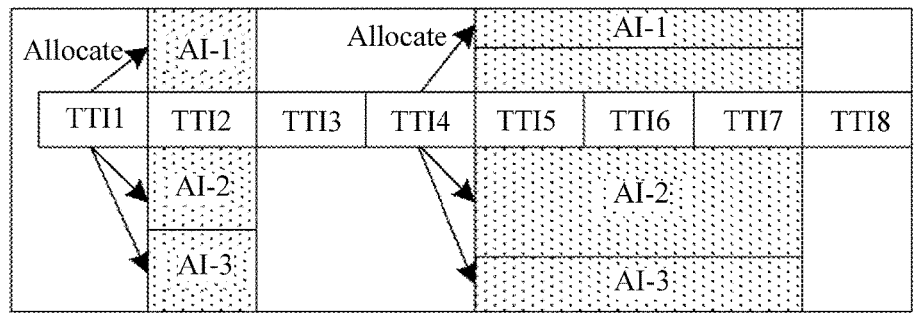
FIG. 14 is a schematic diagram 5 of resource allocation according to an embodiment of the present invention.

Optionally, in the resource allocation method provided in this embodiment of the present invention, the allocated resource may change dynamically. That is, the base station may adjust in real time the at least two first resources that are allocated by the base station to the UE and that are in a one-to-one correspondence with the at least two first AI technologies, so as to further improve resource utilization and make resource utilization manners more flexible. As shown in FIG. 14, for example, the first resources that are allocated by the base station to the UE in TTI2 and that separately correspond to AI-1, AI-2, and AI-3 are shown in FIG. 14. In TTI5, TTI6, and TTI7, the base station may adjust resources to be the first resources that are allocated to the UE and that separately correspond to AI-1, AI-2, and AI-3. Specifically, the first resources that are allocated by the base station to the UE in TTI5, TTI6, and TTI7 and that separately corresponding to AI-1, AI-2, and AI-3 are shown in FIG. 14.

Optionally, the resource allocation method provided in this embodiment of the present invention may further be applied to a scenario of carrier aggregation (CA). Specifically, the CA may be intra-base station CA or may be inter-base station CA. Examples of application of the resource allocation method provided in this embodiment of the present invention to a scenario of intra-base station CA and a scenario of inter-base station CA are separately described below.

(1) Scenario of Intra-Base Station CA

Figure 15:
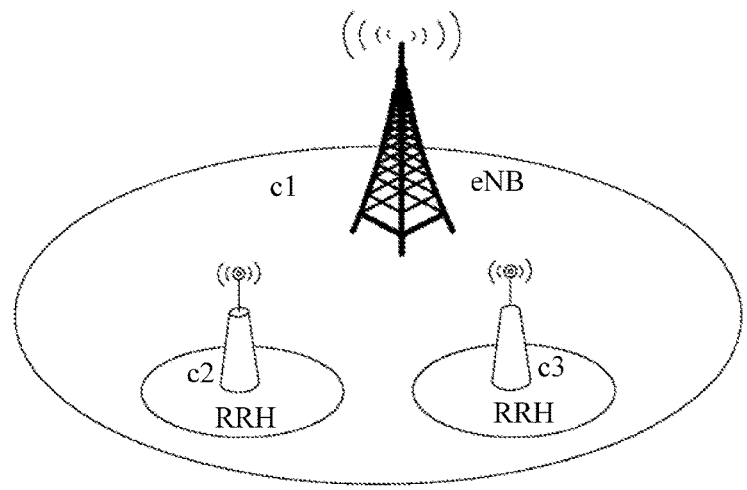
FIG. 15 is a schematic diagram 1 of a carrier aggregation scenario according to an embodiment of the present invention.

For example, FIG. 15 is a schematic diagram of a scenario of intra-base station CA. As shown in FIG. 15, a macro cell served by an evolved node base station (eNB) has macro coverage, and a small cell served by two remote radio heads (RRH) has local hotspot coverage. The macro cell is marked as c1. Two small cells are separately marked as c2 and c3. C1, c2, and c3 may be intra-frequency cells or may be inter-frequency cells. The intra-frequency cells mean that the cells have a same working frequency. The inter-frequency cells mean that the cells have different working frequencies. A backhaul link between an eNB and each RRH is ideal. That is, it may be considered that a delay of the backhaul link is basically 0, and the backhaul link has unlimited transmission capacity.

Figure 16:
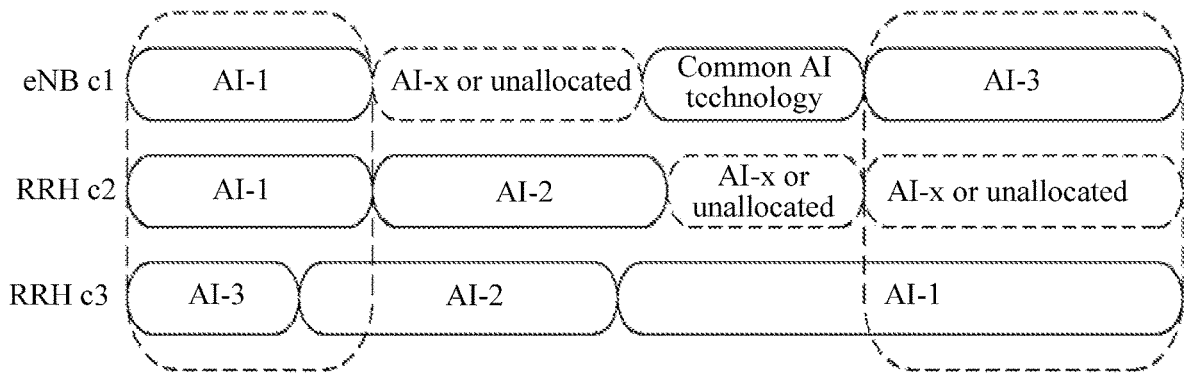
FIG. 16 is a schematic diagram 6 of resource allocation according to an embodiment of the present invention.

As shown in FIG. 16, in each cell, the base station may allocate a resource according to the resource allocation method provided in this embodiment of the present invention. UEs in these cells may then separately select, according to respective cells, a cell to access, or the base station configures CA for the UEs, or the base station configures coordinated multiple point (CoMP, coordinated multiple point) transmission for the UEs, so that multiple cells serve the UEs. Compared with CA or CoMP in the prior art, here, each cell further includes multiple first AI technologies. Each first AI technology or each first AI technology group (including multiple first AI technologies) is used as a virtual cell. In this case, based on CA or CoMP in the prior art, a new CA dimension is further introduced, to form a configuration manner of nested CA or nested CoMP. Specifically, there may be several configuration forms as follows:

Configuration Form 1:

For a scenario in which cells are inter-frequency cells: an architecture of CA+virtual CA First level: First-level CA is performed on carriers in the base station.

Second level: Second-level virtual CA is performed on the first AI technologies or the first AI technology groups on the carriers in the base station, and management is performed on each carrier according to the architecture of the virtual CA.

Configuration Form 2:

For a scenario in which cells are intra-frequency cells: an architecture of CoMP+virtual CA First level: CoMP is performed on transmit points in the base station.

Second level: Second-level virtual CA is performed on the first AI technologies or the first AI technology groups on the carriers in the base station, and management is performed on each carrier according to the architecture of the virtual CA.

Configuration Form 3:

For two scenarios of the foregoing configuration form 1 and configuration form 2: a new architecture of virtual CA First level: The first AI technology is used as a virtual carrier, and the first AI technologies or the first AI technology groups that are the same on carriers in the base station are used as a virtual carrier. Management is performed by using the first AI technology as a granularity and according to the architecture of the virtual CA.

Second level: Inter-frequency radio resource management and intra-frequency radio resource management in virtual carriers formed by using the first AI technology are performed, and radio resources may be located on a same carrier or different carriers.

To describe specific embodiments of the foregoing three configuration forms more clearly, some processing processes used during the specific embodiments are further described below.

The configuration form 1 is used as an example. In this embodiment of the present invention, the base station first configures CA for the UE. Specifically, the base station configures a primary cell (marked as Pcell) and at least one secondary cell (marked as Scell) for the UE. Then the base station further allocates, on carriers on which Pcell and/or Scell work/works and according to the resource allocation method provided in this embodiment of the present invention, the at least two first resources that are in a one-to-one correspondence with the at least two first AI technologies, so as to complete resource allocation corresponding to each first AI technology. Further, according to any one or more of the following conditions, the base station may further manage these first AI technologies, for example, may add or delete a first AI technology, activate or deactivate a first AI technology, and adjust a bandwidth of a first AI technology or a frequency range occupied by the first AI technology. The conditions include, but are not limited to: a change of a service transmitted between the UE and the base station, a change of the load of the base station, and an interference measurement result, an RRM measurement result, and CSI measurement of the UE. The deactivating a first AI technology means temporarily turning off the first AI technology for the UE. That is, the base station does not use the first AI technology and the first resource corresponding to the first AI technology to transmit data to the UE.

Examples of specific embodiments of a random access process on a MAC layer, a HARQ process, a power headroom report (PHR), and an automatic repeat request (ARQ) status report of an RLC layer after the base station allocates, to the UE on the carriers on which the Pcell and/or the Scell work/works, the at least two first resources that are in a one-to-one correspondence with the at least two first AI technologies are further described below.

(1) Random access process

In this embodiment of the present invention, the UE may use any first AI technology to request, from the base station by using a random access process, an uplink resource corresponding to this first AI technology or another first AI technology. Specifically, the UE may add, to a random access process message 3, parameter information of the corresponding first AI technology. In this way, if the UE needs to request, from the base station, uplink resources corresponding to multiple first AI technologies. In this way, the UE only needs to initiate one random access process, so that access resources can be saved.

(2) HARQ feedback ACK /HACK

The UE may generally feed back, by using a physical uplink control channel (PUCCH) on a first AI technology, ACKs/NACKs of multiple first AI technologies. For a format of the PUCCH, refer to the method for feeding back, on a primary carrier, HARQ ACK/NACK information on multiple carriers in an existing CA scenario. Details are not described here again.

(3) PHR

Maximum allowed transmit powers (which may be marked as: Pcmax) corresponding to different first AI technologies and calculated PHs (that is, power headroom) values may be different. Therefore, the PHR may include Pcmax and PH of multiple first AIs.

(4) RLC layer ARQ status report

An RLC status report on a first AI technology may be sent by using another first AI technology. Parameter information of a resource block identifier, a logic channel identifier or the first AI technology is carried in the RLC status report, so that the first AI technology of the RLC status report can be recognized.

It may be understood that, the foregoing (1), (2), (3), and (4) are embodiment processes or manners that are independent from each other.

In a scenario of intra-base station CA, by using the method provided in this embodiment of the present invention and the corresponding architecture, resource allocation of multiple first AI technologies on one or more carriers can further be effectively managed.

(2) Scenario of inter-base station CA

Figure 17:
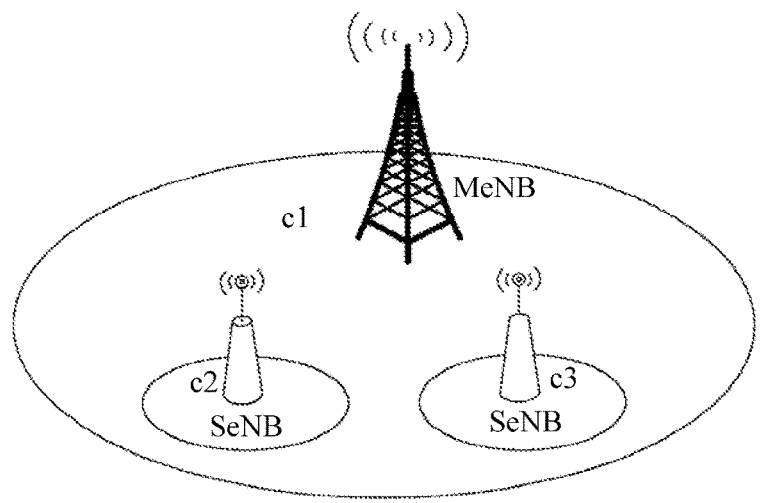
FIG. 17 is a schematic diagram 2 of a carrier aggregation scenario according to an embodiment of the present invention.

For example, FIG. 17 is a schematic diagram of a scenario of inter-base station CA. As shown in FIG. 17, a primary cell served by a primary base station (marked as MeNB) has macro coverage, and a secondary cell served by two secondary base stations (marked as SeNB) has local hotspot coverage. The primary cell is marked as c4, and the two secondary cells are separately marked as c5 and c6. C4, c5, and c6 may be intra-frequency cells or may be inter-frequency cells. The intra-frequency cells mean that the cells have a same working frequency. The inter-frequency cells mean that the cells have different working frequencies. A backhaul link between the MeNB and each SeNB is non-ideal. That is, it may be considered that the backhaul link has a particular delay, and the backhaul link has limited transmission capacity. Therefore, in the scenario, control signaling of the radio resource, feedback information of HARQ, and the like generally need to be performed separately by the MeNB and the SeNB. That is, the MeNB and the SeNB separately manage respective radio resources. However, X2 interfaces of the MeNB and the SeNB may be used to perform coordination of some resources, for example, perform coordination of configuration of semi-static resources.

Figure 18:
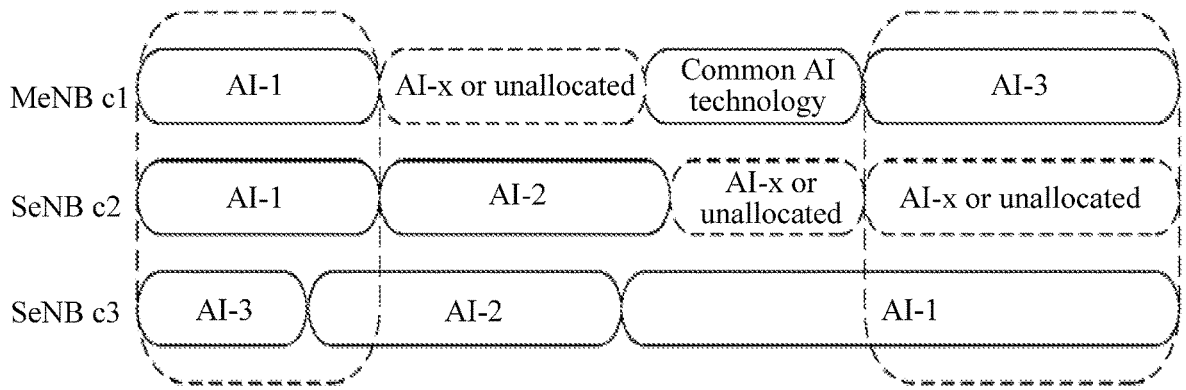
FIG. 18 is a schematic diagram 7 of resource allocation according to an embodiment of the present invention.

As shown in FIG. 18, at each cell, the base station may allocate a resource according to the resource allocation method provided in this embodiment of the present invention. UEs in these cells may then separately select, according to respective cells of the UEs, a cell to access, or the base station configures inter-base station CA (generally referred to as DC) for the UEs, or the base station configures enhanced coordinated multiple point (eCoMP) transmission for the UEs, so that the multiple cells serve the UEs. These cells are distributed at different base stations, and generally have complete air interface protocol stacks. Compared with DC or eCoMP in the prior art, here, each cell further includes multiple AI technologies (including at least two first AI technologies corresponding to a cell served by the primary base station and at least one second AI technology corresponding to a cell served by a secondary base station). Each AI technology or each AI technology group (including multiple AI technologies) is used as a virtual cell. Therefore, based on DC or eCoMP in the prior art, a new CA dimension is further introduced, so as to form a configuration manner of nested DC or nested eCoMP. Specifically, there may be several configuration forms as follows:

Configuration Form 1:

For a scenario in which cells are inter-frequency cells: an architecture of DC+virtual CA First level: First-level DC is performed on carriers among base stations.

Second level: Second-level virtual CA is performed on AI technologies (including the first AI technology and the second AI technology) or AI technology groups on carriers among the base stations, and management is performed on each carrier according to the architecture of virtual CA.

Configuration Form 2:

For a scenario in which cells are intra-frequency cells: an architecture of eCoMP+virtual CA First level: eCoMP is performed among base stations.

Second level: Second-level virtual CA is performed on AI technologies (including the first AI technology and the second AI technology) or AI technology groups on carriers among the base stations, and management is performed on each carrier according to the architecture of virtual CA.

Configuration Form 3:

For two scenarios of the foregoing configuration form 1 and configuration form 2: a new architecture of virtual CA First level: The first AI technology and the second AI technology are used as virtual carriers. AI technologies or AI technology groups on carriers among the base stations are used on one virtual carrier, and management is performed by using an AI technology as a granularity and according to the architecture of virtual CA. Optionally, only AI technologies on carriers provided a same eNB are used as one virtual carrier for processing. Same AIs on carriers provided by different eNBs are used as different virtual carriers for processing.

Second level: Inter-frequency radio resource management and intra-frequency radio resource management in virtual carriers formed by using the AI technology are performed, and radio resources may be located on a same carrier or different carriers, optionally, may be located on a same carrier or different carriers provided by a same eNB.

To describe specific embodiments of the foregoing three configuration forms more clearly, some processing processes used during the specific embodiments are further described below.

In a scenario of inter-base station CA, the base station shown in FIG. 1 is a primary base station.

Figure 19:
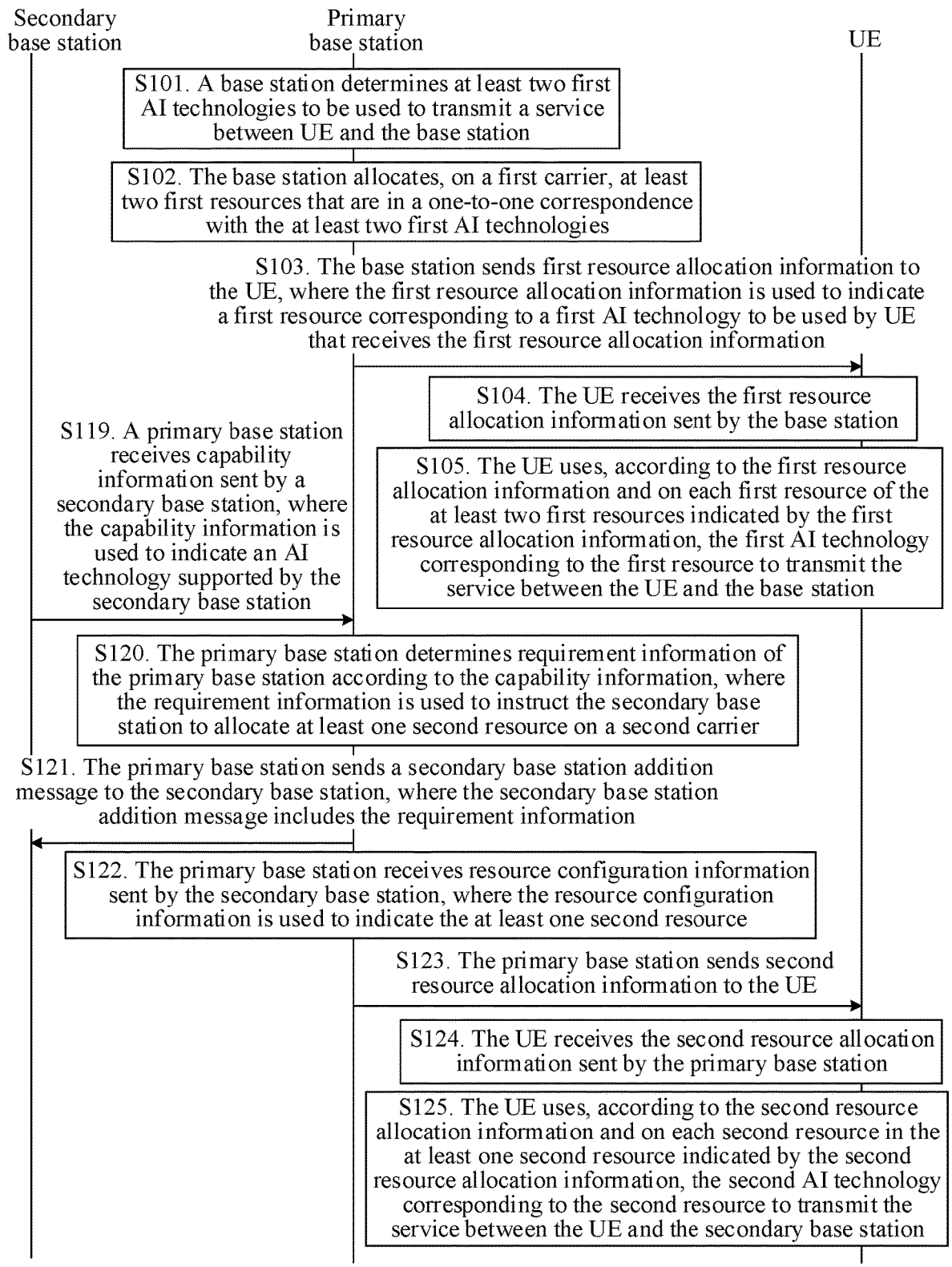
FIG. 19 is an interaction diagram 10 of a resource allocation method according to an embodiment of the present invention.

With reference to FIG. 1, as shown in FIG. 19, the resource allocation method provided in this embodiment of the present invention may further include the following steps.

S119: The primary base station receives capability information sent by a secondary base station, where the capability information is used to indicate an AI technology supported by the secondary base station.

In this embodiment, the primary base station and the secondary base station are two base stations that perform CA. The primary base station and the secondary base station may be two macro base stations, or may be two micro base stations, or may be a macro base station and a micro base station. This is not specifically limited in the embodiments of the present invention.

In a scenario of inter-base station CA, the secondary base station may report the capability information of the secondary base station to the primary base station. The capability information may be used to indicate an AI technology that can be supported by the secondary base station.

S120: The primary base station determines requirement information of the primary base station according to the capability information, where the requirement information is used to instruct the secondary base station to allocate at least one second resource on a second carrier.

The at least one second resource is used to transmit the service between the UE and the secondary base station. The at least one second AI technology needs to be used to transmit the service between the UE and the secondary base station. The at least one second resource corresponds one by one to the at least one second AI technology. The at least one second AI technology is at least one AI technology of AI technologies supported by the secondary base station.

In this embodiment, in a CA scenario of the inter-base station, the primary base station allocates, to the UE on the first carrier, the at least two first resources that are in a one-to-one correspondence with the at least two first AI technologies. The primary base station requires that the secondary base station allocates, on the second carrier to the UE, the at least one second resource that corresponds one by one to the at least one second AI technology. The first carrier is a carrier of the primary base station, the second carrier is a carrier of the secondary base station, and the first carrier and the second carrier are carriers for which CA is performed.

In this embodiment of the present invention, the at least one second AI technology and the AI technology of the at least two first AI technologies may be different. The at least one second AI technology and the AI technology of the at least two first AI technologies may be the same or partially the same. This is not limited in the embodiments of the present invention. That is, on different carriers, the primary base station and the secondary base station may allocate a resource corresponding to a same AI technology or may allocate resources corresponding to different AI technologies.

S121: The primary base station sends a secondary base station addition message to the secondary base station, where the secondary base station addition message includes the requirement information.

When the primary base station and the secondary base station perform CA, the primary base station sends the secondary base station addition message to the secondary base station. In this case, the primary base station may add the requirement information of the primary base station to the secondary base station addition message. The requirement information is used to instruct the secondary base station to allocate, on a carrier on which the secondary base station works, for example, the second carrier, the at least one second resource that corresponds one by one to the at least one second AI technology.

S122: The primary base station receives resource configuration information sent by the secondary base station, where the resource configuration information is used to indicate the at least one second resource.

S123: The primary base station sends second resource allocation information to the UE.

The second resource allocation information is used to indicate a second resource corresponding to a second AI technology to be used by UE that receives the second resource allocation information. For the UE, the UE at least uses the second AI technology. Therefore, the second resource indicated by the second resource allocation information is the at least one second resource.

S124: The UE receives the second resource allocation information sent by the primary base station.

S125: The UE uses, according to the second resource allocation information and on each second resource in the at least one second resource indicated by the second resource allocation information, the second AI technology corresponding to the second resource to transmit the service between the UE and the secondary base station.

After allocating the at least one second resource, the secondary base station sends resource configuration information to the primary base station. The resource configuration information is used to indicate the second resource. The primary base station then indicates, to the UE by using the second resource allocation information, the second resource corresponding to the second AI technology to be used by the UE, so that the UE uses, on each second resource in the at least one second resource indicated by the second resource allocation information, the second AI technology corresponding to the second resource to transmit the service between the UE and the secondary base station.

It may be understood that, similar to the foregoing S103, if there are multiple UEs, the primary base station needs to separately send the second resource allocation information to each UE, to indicate, to these UEs, second resources corresponding to second AI technologies used by the UEs. Details are not described here again.

It should be noted that, the base station in S101 to S105 in FIG. 19 is a primary base station. An execution sequence of S101 to S105 and S119 to S125 is not limited in this embodiment of the present invention. That is, in this embodiment of the present invention, S101 to S105 may be performed before S119 to S125 are performed. Alternatively, S119 to S125 may be performed before S101 to S105 are performed. Alternatively, S101 to S105 and S119 to S125 may be performed at the same time. A specific execution sequence may further be adaptively adjusted according to an actual application scenario of CA. This is not limited in the embodiments of the present invention.

Optionally, in a scenario of inter-base station CA, mapping relationships between the at least two first AI technologies and the DRB established by the primary base station and a mapping relationship between the at least one second AI technology and the DRB are both sent to the UE by the primary base station by using the RRC reconfiguration message. That is, the UE may learn, according to the RRC reconfiguration message, which AI technology/technologies are used on which DRBs to transmit the service.

In a scenario of inter-base station CA, by using the method provided in this embodiment of the present invention and the corresponding architecture, resource allocation of multiple AI technologies on one or more carriers can further be effectively managed.

This embodiment of the present invention provides a resource allocation method. The method includes: determining, by the base station, the at least two first AI technologies to be used to transmit the service between the UE and the base station; allocating, by the base station on the first carrier, the at least two first resources that are in a one-to-one correspondence with the at least two first AI technologies, where the at least two first resources are used to transmit the service between the UE and the base station; and sending, by the base station, the first resource allocation information to the UE, where the first resource allocation information is used to indicate a first resource corresponding to a first AI technology to be used by UE that receives the first resource allocation information.

Based on the foregoing technical solution, after the base station determines the at least two first AI technologies to be used to transmit the service between the UE and the base station, the base station may simultaneously allocate a first resource to each first AI technology of the at least two first AI technologies separately on a carrier, that is, the first carrier. Therefore, the resource allocation method provided in this embodiment of the present invention may enable, by performing a frequency division manner on the first carrier, the first carrier to simultaneously support the at least two first AI technologies, thereby improving resource utilization and making resource utilization manners more flexible.

Further, in the resource allocation method provided in this embodiment of the present invention, resources that are allocated by the base station to the UE and that correspond to the AI technologies (including the first AI technology and the second AI technology) may be dynamically adjusted, so as to further improve resource utilization and make resource utilization manners more flexible.

Further, the resource allocation method provided in this embodiment of the present invention may be applied to a CA scenario, and therefore resource allocation of multiple AI technologies on one or more carriers can further be effectively managed.

Embodiment 2

Figure 20:
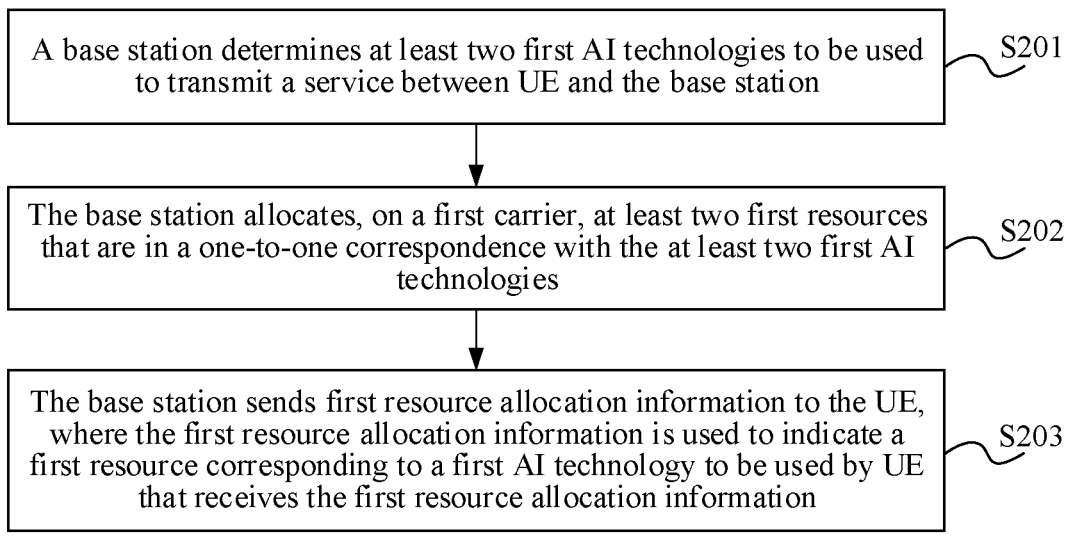
FIG. 20 is a flowchart 1 of a resource allocation method according to an embodiment of the present invention.

As shown in FIG. 20, an embodiment of the present invention provides a resource allocation method. The resource allocation method may include the following steps.

S201: A base station determines at least two first AI technologies to be used to transmit a service between UE and the base station.

S202: The base station allocates, on a first carrier, at least two first resources that are in a one-to-one correspondence with the at least two first AI technologies.

The at least two first resources are used to transmit the service between the UE and the base station.

S203: The base station sends first resource allocation information to the UE, where the first resource allocation information is used to indicate a first resource corresponding to a first AI technology to be used by UE that receives the first resource allocation information.

In this embodiment, there may be one or more UEs. When there is one UE, the at least two first AI technologies are at least two first AI technologies to be used to transmit the service between the UE and the base station. When there are multiple UEs, the at least two first AI technologies are at least two first AI technologies to be used to transmit services between the multiple UEs and the base station. Further, when there are multiple UEs, each of the multiple UEs may separately use a different first AI technology (for example, each UE uses a first AI technology different from first AI technologies used by other UEs). Alternatively, some of the multiple UEs may use a same first AI technology (for example, some UEs use a first AI technology different from first AI technologies used by other UEs). The embodiments of the present invention are not specifically limited thereto.

Further, in this embodiment of the present invention, one UE may use one first AI technology or multiple first AI technologies to transmit one service. The embodiments of the present invention are not specifically limited thereto.

When there are multiple UEs, in the foregoing S203, the base station may separately indicate, to the multiple UEs by using the first resource allocation information, first resources corresponding to the first AI technologies used by the UEs. It may be understood that, for each UE, there may be one or more first resources.

For the description of the foregoing S201 to S203, specifically, refer to the related description of S101 to S103 in the foregoing Embodiment 1. Details are not described here again.

It should be noted that, for the first AI technology, the first resource, the first resource allocation information, and the like that are used in this embodiment, refer to the related description of the first AI technology, the first resource, the first resource allocation information, and the like in the foregoing Embodiment 1. Details are not described here again.

Further, for a specific embodiment process of the foregoing S201 to S203, refer to the related description of a specific embodiment process of S101 to S103 in the foregoing Embodiment 1. Details are not described here again.

In the resource allocation method provided in this embodiment of the present invention, after the base station determines the at least two first AI technologies to be used to transmit the service between the UE and the base station, the base station may simultaneously allocate a first resource to each first AI technology of the at least two first AI technologies separately on a carrier, that is, the first carrier. Therefore, the resource allocation method provided in this embodiment of the present invention may enable, by performing a frequency division manner on the first carrier, the first carrier to simultaneously support the at least two first AI technologies, thereby improving resource utilization and making resource utilization manners more flexible.

Embodiment 3

Figure 21:
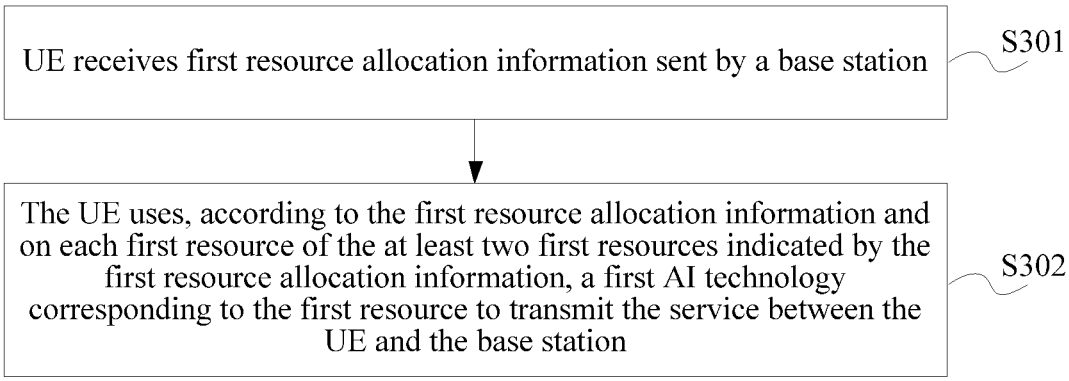
FIG. 21 is a flowchart 2 of a resource allocation method according to an embodiment of the present invention.

As shown in FIG. 21, an embodiment of the present invention provides a resource allocation method. The resource allocation method may include the following steps.

S301: UE receives first resource allocation information sent by a base station.

The first resource allocation information is used to indicate at least two first resources that are allocated on a first carrier by the base station. The at least two first resources are used to transmit a service between the UE and the base station. At least two first AI technologies to be used to transmit the service between the UE and the base station. The at least two first AI technologies are in a one-to-one correspondence with the at least two first resources.

S302: The UE uses, according to the first resource allocation information and on each first resource of the at least two first resources indicated by the first resource allocation information, a first AI technology corresponding to the first resource to transmit the service between the UE and the base station.

For the description of the foregoing S301 and S302, specifically, refer to the related description of S104 and S105 in the foregoing Embodiment 1. Details are not described here again.

It should be noted that, for the first AI technology, the first resource, the first resource allocation information, and the like that are used in this embodiment, refer to the related description of the first AI technology, the first resource, the first resource allocation information, and the like in the foregoing Embodiment 1. Details are not described here again.

Further, for a specific embodiment process of the foregoing S301 and S302, refer to the related description of a specific embodiment process of S104 and S105 in the foregoing Embodiment 1. Details are not described here again.

In the resource allocation method provided in this embodiment of the present invention, after the base station determines the at least two first AI technologies to be used to transmit the service between the UE and the base station, the base station may simultaneously allocate a first resource to each first AI technology of the at least two first AI technologies separately on a carrier, that is, the first carrier. Therefore the resource allocation method provided in this embodiment of the present invention may enable, by performing a frequency division manner on the first carrier, the first carrier to simultaneously support the at least two first AI technologies, so that the UE can simultaneously use the at least two AI technologies on the first carrier to transmit the service, thereby improving resource utilization and making resource utilization manners more flexible.

Embodiment 4

Figure 22:
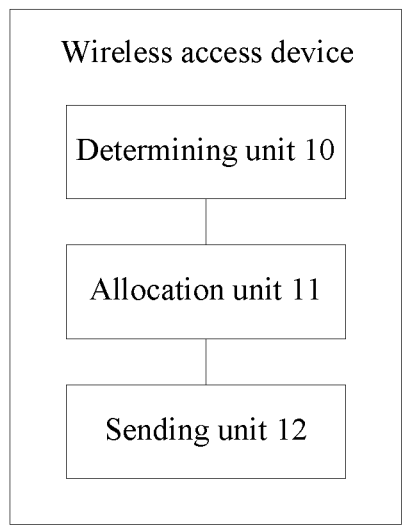
FIG. 22 is a schematic structural diagram 1 of a wireless access device according to an embodiment of the present invention.

As shown in FIG. 22, an embodiment of the present invention provides a wireless access device. The wireless access device may include:

a determining unit 10, configured to: determine at least two first AI technologies to be used to transmit a service between UE and the wireless access device; an allocation unit 11, configured to allocate, on a first carrier, at least two first resources that are in a one-to-one correspondence with the at least two first AI technologies determined by the determining unit 10, where the at least two first resources are used to transmit the service between the UE and the wireless access device; and a sending unit 12, configured to send first resource allocation information to the UE, where the first resource allocation information is used to indicate a first resource that is allocated by the allocation unit 11 and that corresponds to a first AI technology to be used by UE that receives the first resource allocation information.

Optionally, the determining unit 10 is specifically configured to: obtain first information, and determine, according to the first information, the at least two first AI technologies to be used to transmit the service between the UE and the wireless access device, where the first information is used to determine the at least two first AI technologies.

Optionally, the sending unit 12 is further configured to: before sending the first resource allocation information to the UE, send common control information to the UE, where the common control information includes resource information of dedicated control information, the common control information is control information in a common frequency range of the at least two first AI technologies on the first carrier, the dedicated control information is control information in a frequency range separately occupied on the first carrier by each first AI technology of the at least two first AI technologies, and the resource information of the dedicated control information is used by the UE to receive the dedicated control information. The sending unit 12 is specifically configured to send the dedicated control information to the UE, where the dedicated control information includes the first resource allocation information.

Optionally, the sending unit 12 is further configured to: before the determining unit 10 determines the at least two first AI technologies to be used to transmit the service between the UE and the wireless access device, send an RRC reconfiguration message to the UE, where the RRC reconfiguration message includes resource information of dedicated control information, the resource information of the dedicated control information includes a resource location of the dedicated control information and an index of the dedicated control information, and the dedicated control information is control information in a frequency range separately occupied on the first carrier by each first AI technology of the at least two first AI technologies. The sending unit 12 is further configured to: before sending the first resource allocation information to the UE, send common control information to the UE, where the common control information includes the index of the dedicated control information, the common control information is control information in a common frequency range of the at least two first AI technologies on the first carrier, and the index of the dedicated control information and the resource information of the dedicated control information are used by the UE to receive the dedicated control information. The sending unit 12 is specifically configured to send the dedicated control information to the UE, where the dedicated control information includes the first resource allocation information.

Optionally, the sending unit 12 is specifically configured to send control information to the UE, where the control information includes the first resource allocation information.

Optionally, the sending unit 12 is further configured to send common system information and dedicated system information, where the common system information includes resource information of the dedicated system information, the common system information is system information in the common frequency range of the at least two first AI technologies on the first carrier, the dedicated system information is system information in a frequency range separately occupied on the first carrier by each first AI technology of the at least two first AI technologies, and the resource information of the dedicated system information is used by the UE to receive the dedicated system information.

Optionally, the sending unit 12 is further configured to send measurement configuration information or DMRSs corresponding to the at least two first AI technologies to the UE, where the measurement configuration information or the DMRSs are used to instruct the UE to perform RRM measurement or CSI measurement, where the measurement configuration information is carried in the dedicated control information; or, the measurement configuration information is carried in the dedicated system information; or, the measurement configuration information is carried in the RRC reconfiguration message.

Optionally, the at least two first AI technologies include a first sub-AI technology and at least one second sub-AI technology, and the at least two first resources include a first subresource corresponding to the first sub-AI technology and at least one second subresource that corresponds one by one to the at least one second sub-AI technology.

The allocation unit 11 is specifically configured to: allocate the first subresource on the first carrier, and allocate the at least one second subresource on a resource other than the first subresource on the first carrier, where a bandwidth of the first subresource and a bandwidth of each second subresource of the at least one second subresource are both less than a bandwidth of the first carrier.

Optionally, the at least two first AI technologies include a first sub-AI technology and at least one second sub-AI technology, and the at least two first resources include a first subresource corresponding to the first sub-AI technology and at least one second subresource that corresponds one by one to the at least one second sub-AI technology.

The allocation unit 11 is specifically configured to: allocate the first subresource on the first carrier, and allocate the at least one second subresource on an idle resource of the first subresource, where a bandwidth of each second subresource of the at least one second subresource is less than a bandwidth of the first subresource.

Figure 23:
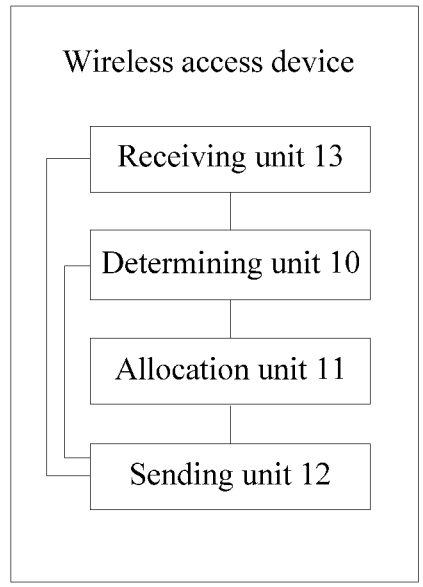
FIG. 23 is a schematic structural diagram 2 of a wireless access device according to an embodiment of the present invention.

Optionally, with reference to FIG. 22, as shown in FIG. 23, the wireless access device is a primary base station, and the primary base station further includes a receiving unit 13.

The receiving unit 13 is configured to receive capability information sent by a secondary base station, where the capability information is used to indicate an AI technology supported by the secondary base station, and the primary base station and the secondary base station perform carrier aggregation. The determining unit 10 is further configured to determine requirement information of the primary base station, where the requirement information is used to instruct the secondary base station to allocate the at least one second resource on a second carrier, the at least one second resource is used to transmit the service between the UE and the secondary base station, at least one second AI technology needs to be used to transmit the service between the UE and the secondary base station, the at least one second resource corresponds one by one to the at least one second AI technology, and the at least one second AI technology is at least one AI technology of AI technologies that are received by the receiving unit 13 and that are supported by the secondary base station. The sending unit 12 is further configured to send a secondary base station addition message to the secondary base station, where the secondary base station addition message includes the requirement information determined by the determining unit 10. The receiving unit 13 is further configured to receive resource configuration information sent by the secondary base station, where the resource configuration information is used to indicate the at least one second resource. The sending unit 12 is further configured to send the second resource allocation information to the UE, where the second resource allocation information is used to indicate a second resource that is received by the receiving unit 13 and that corresponds to a second AI technology to be used by UE that receives the second resource allocation information.

Optionally, a mapping relationship between the at least two first AI technologies determined by the determining unit 10 and a DRB established by the primary base station and a mapping relationship between the at least one second AI technology and the DRB received by the receiving unit 13 are both sent by the sending unit 12 to the UE by using an RRC reconfiguration message.

It should be noted that, for the description of the first AI technology, the first resource, the first resource allocation information, the second AI technology, the second resource, the second resource allocation information, the common control information, the dedicated control information, the control information, the common system information, the dedicated system information, the measurement configuration information, the DMRS, the CA scenario, and the like that are used in this embodiment, refer to the related description in the foregoing Embodiment 1. Details are not described here again.

For the wireless access device provided in this embodiment of the present invention, after the wireless access device determines the at least two first AI technologies to be used to transmit the service between the UE and the wireless access device, the wireless access device may simultaneously allocate a first resource to each first AI technology of the at least two first AI technologies separately on a carrier, that is, a first carrier. Therefore, the wireless access device provided in this embodiment of the present invention may enable, by performing a frequency division manner on the first carrier, the first carrier to simultaneously support the at least two first AI technologies, thereby improving resource utilization and making resource utilization manners more flexible.

Embodiment 5

Figure 24:
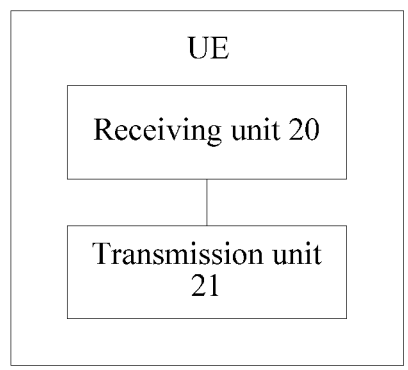
FIG. 24 is a schematic structural diagram 1 of UE according to an embodiment of the present invention.

As shown in FIG. 24, an embodiment of the present invention provides UE. The UE may include:

a receiving unit 20, configured to receive first resource allocation information sent by a wireless access device, where the first resource allocation information is used to indicate at least two first resources allocated on a first carrier by the wireless access device, the at least two first resources are used to transmit a service between the UE and the wireless access device, at least two first AI technologies to be used to transmit the service between the UE and the wireless access device, and the at least two first AI technologies are in a one-to-one correspondence with the at least two first resources; and a transmission unit 21, configured to use, according to the first resource allocation information received by the receiving unit 20 and on each first resource of the at least two first resources indicated by the first resource allocation information, a first AI technology corresponding to the first resource to transmit the service between the UE and the wireless access device.

Optionally, the receiving unit 20 is further configured to: before receiving the first resource allocation information sent by the wireless access device, receive common control information sent by the wireless access device, where the common control information includes resource information of dedicated control information, the common control information is control information in a common frequency range of the at least two first AI technologies on the first carrier, and the dedicated control information is control information in a frequency range separately occupied on the first carrier by each first AI technology of the at least two first AI technologies. The receiving unit 20 is specifically configured to receive, according to the resource information of the dedicated control information, the dedicated control information sent by the wireless access device, where the dedicated control information includes the first resource allocation information.

Optionally, the receiving unit 20 is further configured to: before receiving the first resource allocation information sent by the wireless access device, receive an RRC reconfiguration message and the common control information sent by the wireless access device, where the RRC reconfiguration message includes resource information of dedicated control information, the resource information of the dedicated control information includes a resource location of the dedicated control information and an index of the dedicated control information, the dedicated control information is control information in a frequency range separately occupied on the first carrier by each first AI technology of the at least two first AI technologies, the common control information includes the index of the dedicated control information, and the common control information is control information in a common frequency range of the at least two first AI technologies on the first carrier. The receiving unit 20 is specifically configured to receive, according to the index of the dedicated control information and the resource information of the dedicated control information, the dedicated control information sent by the wireless access device, where the dedicated control information includes the first resource allocation information.

Optionally, the receiving unit 20 is specifically configured to receive control information sent by the wireless access device, where the control information includes the first resource allocation information.

Optionally, the receiving unit 20 is further configured to: receive common system information sent by the wireless access device, where the common system information includes resource information of dedicated system information, and receive, according to the resource information of the dedicated system information, the dedicated system information sent by the wireless access device, the common system information is system information in the common frequency range of the at least two first AI technologies on the first carrier, and the dedicated system information is system information in a frequency range separately occupied on the first carrier by each first AI technology of the at least two first AI technologies.

Figure 25:
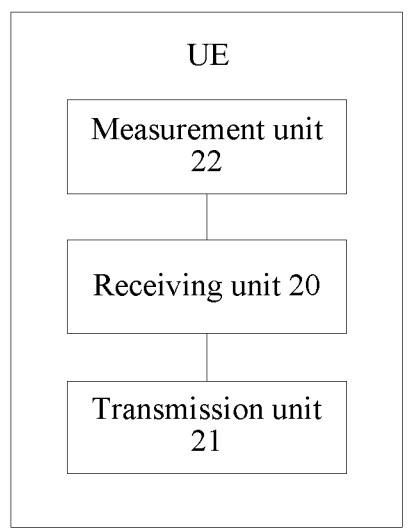
FIG. 25 is a schematic structural diagram 2 of UE according to an embodiment of the present invention.

Optionally, with reference to FIG. 24, as shown in FIG. 25, the UE further includes a measurement unit 22.

The receiving unit 20 is further configured to receive measurement configuration information or DMRSs that are sent by the wireless access device and that correspond to the at least two first AI technologies, where the measurement configuration information or the DMRSs are used to instruct the UE to perform RRM measurement or CSI measurement. The measurement unit 22 is configured to separately perform RRM measurement or CSI measurement corresponding to the at least two first AI technologies according to the measurement configuration information or the DMRSs received by the receiving unit 20, where the measurement configuration information is carried in the dedicated control information; or, the measurement configuration information is carried in the dedicated system information; or, the measurement configuration information is carried in the RRC reconfiguration message.

Optionally, the wireless access device is a primary base station.

The receiving unit 20 is further configured to receive second resource allocation information sent by the primary base station, where the second resource allocation information is used to indicate at least one second resource allocated on a second carrier by a secondary base station, the at least one second resource is used to transmit the service between the UE and the secondary base station, at least one second AI technology needs to be used to transmit the service between the UE and the secondary base station, the at least one second resource corresponds one by one to the at least one second AI technology, the at least one second AI technology is at least one AI technology of AI technologies supported by the secondary base station, and the primary base station and the secondary base station perform carrier aggregation. The transmission unit 21 is further configured to use, according to the second resource allocation information received by the receiving unit 20 and on each second resource in the at least one second resource indicated by the second resource allocation information, a second AI technology corresponding to the second resource to transmit the service between the UE and the secondary base station.

Optionally, a mapping relationship between the at least two first AI technologies and a DRB established by the primary base station and a mapping relationship between the at least one second AI technology and the DRB are both sent by the primary base station to the UE by using an RRC reconfiguration message.

It should be noted that, for the description of the first AI technology, the first resource, the first resource allocation information, the second AI technology, the second resource, the second resource allocation information, the common control information, the dedicated control information, the control information, the common system information, the dedicated system information, the measurement configuration information, the DMRS, the CA scenario, and the like that are used in this embodiment, refer to the related description in the foregoing Embodiment 1. Details are not described here again.

For the UE provided in this embodiment of the present invention, the UE may simultaneously use at least two AI technologies on the first carrier to transmit the service, so as to improve resource utilization and make resource utilization manners more flexible.

Embodiment 6

An embodiment of the present invention provides a wireless access device. The wireless access device includes a processor, a transceiver, and a memory. The processor, the transceiver, and the memory may be connected to each other and complete communication with each other by using a system bus.

Figure 26:
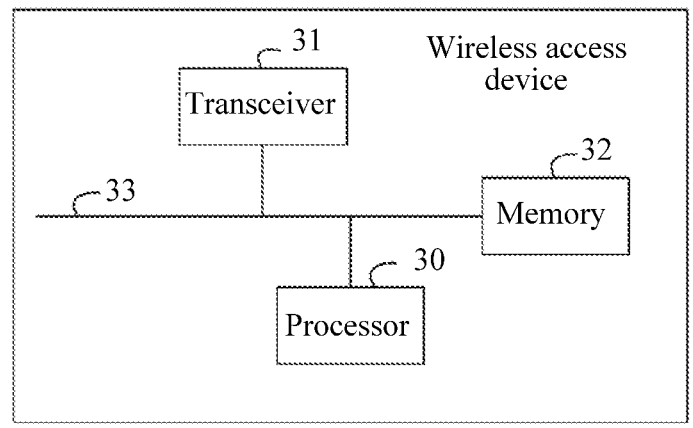
FIG. 26 is a schematic hardware diagram of a wireless access device according to an embodiment of the present invention.

As shown in FIG. 26, FIG. 26 is a schematic hardware diagram of the wireless access device according to this embodiment of the present invention. In FIG. 26, a processor 30, transceiver 31, and a memory 32 are connected to each other and complete communication with each other by using a system bus 33.

The processor 30 may be a central processing unit (CPU).

The memory 32 is configured to: store program code, and transmit the program code to the processor 30. The processor 30 executes the following instruction according to the program code. The memory 32 may include a volatile memory, for example, a random-access memory (RAM). The memory 32 may include a non-volatile memory, for example, a read-only memory (ROM), a flash memory, a hard disk drive (HDD), or a solid-state drive (SSD). The memory 32 may further include a combination of the foregoing types of memories.

The transceiver 31 may be a wireless transceiver. For example, the wireless transceiver may be an antenna and the like of the wireless access device.

When the wireless access device is operated, the processor 30 runs an execution instruction of the wireless access device, and may perform the method procedure in FIG. 1, any one of FIG. 3 to FIG. 9, FIG. 12, FIG. 19 or FIG. 20. The method procedure specifically includes the following content.

The processor 30 is configured to: determine at least two first AI technologies to be used to transmit a service between UE and the wireless access device; and allocate, on a first carrier, at least two first resources that are in a one-to-one correspondence with the at least two first AI technologies, where the at least two first resources are used to transmit the service between the UE and the wireless access device. The transceiver 31 is configured to send first resource allocation information to the UE, where the first resource allocation information is used to indicate a first resource corresponding to a first AI technology to be used by UE that receives the first resource allocation information. The memory 32 is configured to store code of the at least two first AI technologies, code of the at least two first resources, code of the first resource allocation information, and code for controlling the processor 30 to complete the foregoing process, so that the processor 30 invokes and executes the code stored in the memory 32 to complete the foregoing process.

Optionally, the processor 30 is specifically configured to: obtain first information, and determine, according to the first information, the at least two first AI technologies to be used to transmit the service between the UE and the wireless access device, where the first information is used to determine the at least two first AI technologies.

Optionally, the transceiver 31 is further configured to: before sending the first resource allocation information to the UE, send common control information to the UE, where the common control information includes resource information of dedicated control information, the common control information is control information in a common frequency range of the at least two first AI technologies on the first carrier, the dedicated control information is control information in a frequency range separately occupied on the first carrier by each first AI technology of the at least two first AI technologies, and the resource information of the dedicated control information is used by the UE to receive the dedicated control information. The transceiver 31 is specifically configured to send the dedicated control information to the UE, where the dedicated control information includes the first resource allocation information.

Optionally, the transceiver 31 is further configured to: before the processor 30 determines the at least two first AI technologies to be used to transmit the service between the UE and the wireless access device, send an RRC reconfiguration message to the UE, where the RRC reconfiguration message includes resource information of dedicated control information, the resource information of the dedicated control information includes a resource location of the dedicated control information and an index of the dedicated control information, and the dedicated control information is control information in a frequency range separately occupied on the first carrier by each first AI technology of the at least two first AI technologies. The transceiver 31 is further configured to: before the sending the first resource allocation information to the UE, send common control information to the UE, where the common control information includes the index of the dedicated control information, the common control information is control information in a common frequency range of the at least two first AI technologies on the first carrier, and the index of the dedicated control information and the resource information of the dedicated control information are used by the UE to receive the dedicated control information. The transceiver 31 is specifically configured to send the dedicated control information to the UE, where the dedicated control information includes the first resource allocation information.

Optionally, the transceiver 31 is specifically configured to send control information to the UE, where the control information includes the first resource allocation information.

Optionally, the transceiver 31 is further configured to send common system information and dedicated system information, where the common system information includes resource information of the dedicated system information, the common system information is system information in the common frequency range of the at least two first AI technologies on the first carrier, the dedicated system information is system information in a frequency range separately occupied on the first carrier by each first AI technology of the at least two first AI technologies, and the resource information of the dedicated system information is used by the UE to receive the dedicated system information.

Optionally, the transceiver 31 is further configured to send measurement configuration information or DMRSs corresponding to the at least two first AI technologies to the UE, where the measurement configuration information or the DMRSs are used to instruct the UE to perform RRM measurement or CSI measurement, where the measurement configuration information is carried in the dedicated control information; or, the measurement configuration information is carried in the dedicated system information; or, the measurement configuration information is carried in the RRC reconfiguration message.

Optionally, the at least two first AI technologies include a first sub-AI technology and at least one second sub-AI technology, and the at least two first resources include a first subresource corresponding to the first sub-AI technology and at least one second subresource that corresponds one by one to the at least one second sub-AI technology.

The processor 30 is specifically configured to: allocate the first subresource on the first carrier, and allocate the at least one second subresource on a resource other than the first subresource on the first carrier, where a bandwidth of the first subresource and a bandwidth of each second subresource of the at least one second subresource are both less than a bandwidth of the first carrier.

Optionally, the at least two first AI technologies include a first sub-AI technology and at least one second sub-AI technology, and the at least two first resources include a first subresource corresponding to the first sub-AI technology and at least one second subresource that corresponds one by one to the at least one second sub-AI technology.

The processor 30 is specifically configured to: allocate the first subresource on the first carrier, and allocate the at least one second subresource on an idle resource of the first subresource, where a bandwidth of each second subresource of the at least one second subresource is less than a bandwidth of the first subresource.

Optionally, the wireless access device is a primary base station.

The transceiver 31 is configured to receive capability information sent by a secondary base station, where the capability information is used to indicate an AI technology supported by the secondary base station, and the primary base station and the secondary base station perform carrier aggregation. The processor 30 is further configured to determine requirement information of the primary base station, where the requirement information is used to instruct the secondary base station to allocate at least one second resource on a second carrier, the at least one second resource is used to transmit the service between the UE and the secondary base station, at least one second AI technology needs to be used to transmit the service between the UE and the secondary base station, the at least one second resource corresponds one by one to the at least one second AI technology, and the at least one second AI technology is at least one AI technology of AI technologies that are received by the transceiver 31 and that are supported by the secondary base station. The transceiver 31 is further configured to send a secondary base station addition message to the secondary base station, where the secondary base station addition message includes the requirement information determined by the processor 30. The transceiver 31 is further configured to receive resource configuration information sent by the secondary base station, where the resource configuration information is used to indicate the at least one second resource. The transceiver 31 is further configured to send second resource allocation information to the UE, where the second resource allocation information is used to indicate a second resource corresponding to a second AI technology to be used by UE that receives the second resource allocation information.

Optionally, a mapping relationship between the at least two first AI technologies determined by the processor 30 and a DRB established by the primary base station and a mapping relationship between the at least one second AI technology received by the transceiver 31 and the DRB are both sent by the transceiver 31 to the UE by using an RRC reconfiguration message.

It should be noted that, for the description of the first AI technology, the first resource, the first resource allocation information, the second AI technology, the second resource, the second resource allocation information, the common control information, the dedicated control information, the control information, the common system information, the dedicated system information, the measurement configuration information, the DMRS, the CA scenario, and the like that are used in this embodiment, refer to the related description in the foregoing Embodiment 1. Details are not described here again.

For the wireless access device provided in this embodiment of the present invention, after the wireless access device determines the at least two first AI technologies to be used to transmit the service between the UE and the wireless access device, the wireless access device may simultaneously allocate a first resource to each first AI technology of the at least two first AI technologies separately on a carrier, that is, a first carrier. Therefore, the wireless access device provided in this embodiment of the present invention may enable, by performing a frequency division manner on the first carrier, the first carrier to simultaneously support the at least two first AI technologies, thereby improving resource utilization and making resource utilization manners more flexible.

Embodiment 7

An embodiment of the present invention provides UE. The UE includes a processor, a transceiver, and a memory. The processor, the transceiver, and the memory may be connected to each other and complete communication with each other by using a system bus.

Figure 27:
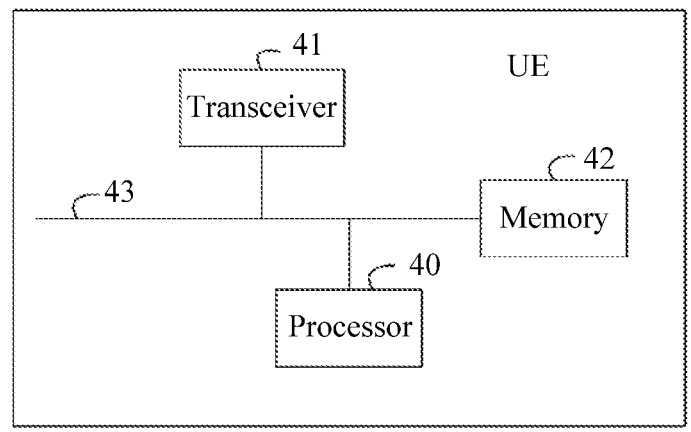
FIG. 27 is a schematic hardware diagram of UE according to an embodiment of the present invention.

As shown in FIG. 27, FIG. 27 is a schematic hardware diagram of the UE in this embodiment of the present invention. In FIG. 27, the processor 40, the transceiver 41, and the memory 42 are connected to each other and complete communication with each other by using a system bus 43.

The processor 40 may be a CPU.

The memory 42 is configured to store program code, and transmit the program code to the processor 40. The processor 40 executes the following instruction according to the program code. The memory 42 may include a volatile memory, for example, a RAM. The memory 42 may further include a non-volatile memory, for example, a ROM, a flash memory, an HDD, or an SSD. The memory 42 may further include a combination of the foregoing types of memories.

The transceiver 41 may be a wireless transceiver. For example, the wireless transceiver may be a mobile phone and an antenna.

When the UE is operated, the processor 40 runs an execution instruction of the UE, and may perform the method procedure in FIG. 1, any one of FIG. 3 to FIG. 9, FIG. 12, FIG. 19 or FIG. 21. The method procedure specifically includes the following content.

The transceiver 41 is configured to receive first resource allocation information sent by a wireless access device, where the first resource allocation information is used to indicate at least two first resources allocated on a first carrier by the wireless access device, the at least two first resources are used to transmit a service between the UE and the wireless access device, at least two first AI technologies to be used to transmit the service between the UE and the wireless access device, and the at least two first AI technologies are in a one-to-one correspondence with the at least two first resources. The processor 40 is configured to use, according to the first resource allocation information received by the transceiver 41 and on each first resource of the at least two first resources indicated by the first resource allocation information, a first AI technology corresponding to the first resource to transmit the service between the UE and the wireless access device. The memory 42 is configured to store code of the at least two first AI technologies, code of the at least two first resources, code of the first resource allocation information, and code for controlling the processor 40 to complete the foregoing process, so that the processor 40 invokes and executes the code stored in the memory 42 to complete the foregoing process.

Specifically, for an uplink service, the processor 40 may process the uplink service, and the transceiver 41 sends the uplink service processed by the processor 40 to the wireless access device. For a downlink service, the transceiver 41 may receive the downlink service sent by the wireless access device, and the processor 40 processes the downlink service.

Optionally, the transceiver 41 is further configured to: before receiving the first resource allocation information sent by the wireless access device, receive common control information sent by the wireless access device, where the common control information includes resource information of dedicated control information, the common control information is control information in a common frequency range of the at least two first AI technologies on the first carrier, and the dedicated control information is control information in a frequency range separately occupied on the first carrier by each first AI technology of the at least two first AI technologies. The transceiver 41 is specifically configured to receive, according to the resource information of the dedicated control information, the dedicated control information sent by the wireless access device, where the dedicated control information includes the first resource allocation information.

Optionally, the transceiver 41 is further configured to: before receiving the first resource allocation information sent by the wireless access device, receive an RRC reconfiguration message and the common control information sent by the wireless access device, where the RRC reconfiguration message includes resource information of dedicated control information, the resource information of the dedicated control information includes a resource location of the dedicated control information and an index of the dedicated control information, the dedicated control information is control information in a frequency range separately occupied on the first carrier by each first AI technology of the at least two first AI technologies, the common control information includes the index of the dedicated control information, and the common control information is control information in a common frequency range of the at least two first AI technologies on the first carrier. The transceiver 41 is specifically configured to receive, according to the index of the dedicated control information and the resource information of the dedicated control information, the dedicated control information sent by the wireless access device, where the dedicated control information includes the first resource allocation information.

Optionally, the transceiver 41 is specifically configured to receive control information sent by the wireless access device, where the control information includes the first resource allocation information.

Optionally, the transceiver 41 is further configured to: receive common system information sent by the wireless access device, where the common system information includes resource information of dedicated system information, and receive, according to the resource information of the dedicated system information, the dedicated system information sent by the wireless access device, the common system information is system information in the common frequency range of the at least two first AI technologies on the first carrier, and the dedicated system information is system information in a frequency range separately occupied on the first carrier by each first AI technology of the at least two first AI technologies.

Optionally, the transceiver 41 is further configured to receive measurement configuration information or DMRSs that are sent by the wireless access device and that correspond to the at least two first AI technologies, where the measurement configuration information or the DMRSs are used to instruct the UE to perform RRM measurement or CSI measurement. The processor 40 is further configured to separately perform RRM measurement or CSI measurement corresponding to the at least two first AI technologies according to the measurement configuration information or the DMRSs received by the transceiver 41, where the measurement configuration information is carried in the dedicated control information; or, the measurement configuration information is carried in the dedicated system information; or, the measurement configuration information is carried in the RRC reconfiguration message.

Optionally, the wireless access device is a primary base station.

The transceiver 41 is further configured to receive second resource allocation information sent by the primary base station, where the second resource allocation information is used to indicate at least one second resource allocated on a second carrier by a secondary base station, the at least one second resource is used to transmit the service between the UE and the secondary base station, at least one second AI technology needs to be used to transmit the service between the UE and the secondary base station, the at least one second resource corresponds one by one to the at least one second AI technology, the at least one second AI technology is at least one AI technology of AI technologies supported by the secondary base station, and the primary base station and the secondary base station perform carrier aggregation. The processor 40 is further configured to use, according to the second resource allocation information received by the transceiver 41 and on each second resource in the at least one second resource indicated by the second resource allocation information, a second AI technology corresponding to the second resource to transmit the service between the UE and the secondary base station.

Optionally, a mapping relationship between the at least two first AI technologies and a DRB established by the primary base station and a mapping relationship between the at least one second AI technology and the DRB are both sent by the primary base station to the UE by using an RRC reconfiguration message.

It should be noted that, for the description of the first AI technology, the first resource, the first resource allocation information, the second AI technology, the second resource, the second resource allocation information, the common control information, the dedicated control information, the control information, the common system information, the dedicated system information, the measurement configuration information, the DMRS, the CA scenario, and the like that are used in this embodiment, refer to the related description in the foregoing Embodiment 1. Details are not described here again.

For the UE provided in this embodiment of the present invention, the UE may simultaneously use at least two AI technologies on the first carrier to transmit the service, so as to improve resource utilization and make resource utilization manners more flexible.

Embodiment 8

Figure 28:
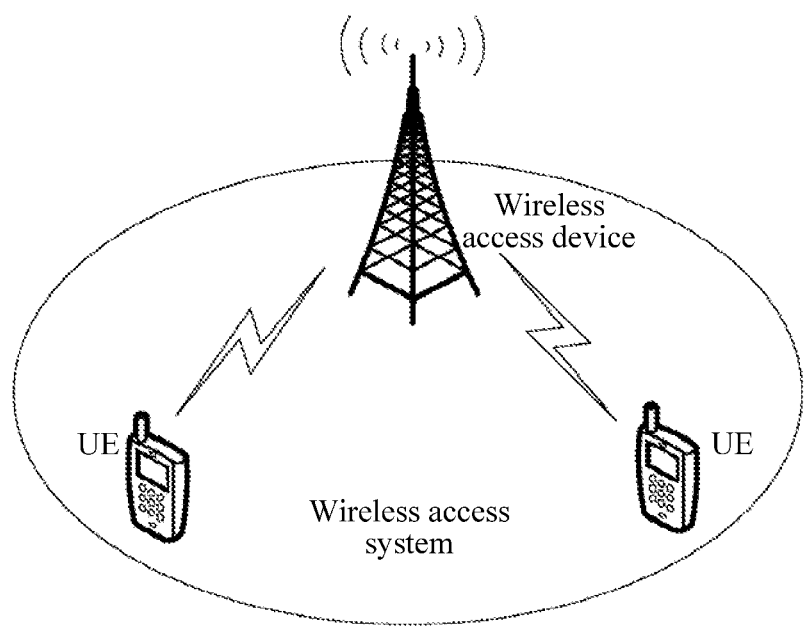
FIG. 28 is an architecture diagram of a wireless access system according to an embodiment of the present invention.

As shown in FIG. 28, an embodiment of the present invention provides a wireless access system. The wireless access system includes a wireless access device and UE. There may be one or more UEs shown in FIG. 28.

For the description of a resource allocation method performed by the wireless access device, specifically, refer to the related description in the foregoing Embodiment 1, Embodiment 2, Embodiment 4, and Embodiment 6. For the description of a resource allocation method performed by the UE, specifically, refer to the related description in the foregoing Embodiment 1, Embodiment 3, Embodiment 5, and Embodiment 7. Details are not described here again.

In this embodiment of the present invention, the wireless access device may be a base station, a distributed base station, a CRAN device, an access network device that includes a radio access network controller and a base station, or the like. Specifically, for a specific form of the wireless access device and the UE, refer to the previous related description of the wireless access device and the UE in the foregoing Embodiment 1. Details are not described here again.

An embodiment of the present invention provides a wireless access system. The wireless access system includes a wireless access device and UE. The wireless access device determines at least two first AI technologies to be used to transmit a service between the UE and the wireless access device. The wireless access device allocates, on a first carrier, at least two first resources that are in a one-to-one correspondence with the at least two first AI technologies, where the at least two first resources are used to transmit the service between the UE and the wireless access device. The wireless access device sends first resource allocation information to the UE, where the first resource allocation information is used to indicate a first resource corresponding to a first AI technology to be used by UE that receives the first resource allocation information.

Based on the foregoing technical solution, after the wireless access device determines the at least two first AI technologies to be used to transmit the service between the UE and the wireless access device, the wireless access device may simultaneously allocate a first resource to each first AI technology of the at least two first AI technologies separately on a carrier, that is, the first carrier. Therefore, the resource allocation method provided in this embodiment of the present invention may enable, by performing a frequency division manner on the first carrier, the first carrier to simultaneously support the at least two first AI technologies, thereby improving resource utilization and making resource utilization manners more flexible.

Further, the wireless access system provided in this embodiment of the present invention may dynamically adjust resources that are allocated by the wireless access device to the UE and that correspond to the AI technologies (including the first AI technology and the second AI technology), so as to further improve resource utilization and make resource utilization manners more flexible.

Further, the wireless access system provided in this embodiment of the present invention may be applied to a CA scenario. When being applied to the CA scenario, the wireless access system may further effectively manage resource allocation of multiple AI technologies on one or more carriers.

It may be clearly understood by a person skilled in the art that, for the purpose of convenient and brief description, division of the foregoing function modules is taken as an example for illustration. During actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described here again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one location, or may be allocated on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The foregoing integrated units may be implemented by using the form of the software function unit.

When the integrated unit is implemented in the form of a software functional unit and sold or used as an independent product, the integrated unit may be stored in a computer-readable storage medium. Based on this, all or some of the technical solutions can be embodied in the form of a software product. The computer software product is stored in a storage medium, and contains several instructions to instruct computer equipment (for example, a personal computer, a server, or network equipment) or a processor to perform all or some steps in the methods in the embodiments of the present invention. The storage medium is a non-transitory medium, and includes various media that can store program code, for example, a flash memory, a removable hard disk, a read-only memory, a random-access memory, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the embodiments of the present invention shall fall within the protection scope of the embodiments of present invention described herein. Therefore, the protection scope shall be subject to the protection scope of the claims.

What is claimed is:

1. A resource allocation method, comprising:
   determining, by a wireless access device, at least two air interface (AI) technologies to be used to transmit a service between a mobile device and the wireless access device;
   allocating, by the wireless access device on a first carrier, at least two resources that are in a one-to-one correspondence with the at least two AI technologies, wherein the at least two resources are separate frequency ranges allocated by the wireless acces device on the first carrier and occupied by separate AI technologies used to transmit the service between the mobile device and the wireless access device; and sending, by the wireless access device, resource allocation information to the mobile device, wherein the resource allocation information is used to indicate each resource and frequency range corresponding to the separate frequency ranges allocated to the at least two AI technologies to be used by mobile device that receives the resource allocation information when transmitting the service between the mobile device and the wireless access device on the first carrier.

2. The resource allocation method according to claim 1, wherein the determining, by a wireless access device, at least two AI technologies to be used to transmit a service between the mobile device and the wireless access device comprises:

obtaining, by the wireless access device, first information, wherein the first information is used to determine the at least two AI technologies to be used to transmit the service between the mobile device and the wireless access device; and determining, by the wireless access device, the at least two AI technologies according to the first information.

3. The resource allocation method according to claim 1, wherein before the sending, by the wireless access device, resource allocation information to the mobile device, the resource allocation method further comprises:

sending, by the wireless access device, common control information to the mobile device, wherein the common control information comprises resource information of dedicated control information, the common control information is control information in a common frequency range of the at least two AI technologies on the first carrier, the dedicated control information is control information in a frequency range separately occupied on the first carrier by each AI technology of the at least two AI technologies, and the resource information of the dedicated control information is used by the mobile device to receive the dedicated control information; and the sending, by the wireless access device, resource allocation information to the mobile device comprises:

sending, by the wireless access device, the dedicated control information to the mobile device, wherein the dedicated control information comprises the resource allocation information.

4. The resource allocation method according to claim 1, wherein before the determining, by a wireless access device, at least two AI technologies to be used to transmit a service between the mobile device and the wireless access device, the resource allocation method further comprises:

sending, by the wireless access device, a radio resource control (RRC) reconfiguration message to the mobile device, wherein the RRC reconfiguration message comprises resource information of dedicated control information, the resource information of the dedicated control information comprises a resource location of the dedicated control information and an index of the dedicated control information, and the dedicated control information is control information in a frequency range separately occupied on the first carrier by each AI technology of the at least two AI technologies;

before the sending, by the wireless access device, resource allocation information to the mobile device, the resource allocation method further comprises:

sending, by the wireless access device, common control information to the mobile device, wherein the common control information comprises the index of the dedicated control information, the common control information is control information in a common frequency range of the at least two AI technologies on the first carrier, and the index of the dedicated control information and the resource information of the dedicated control information are used by the mobile device to receive the dedicated control information; and the sending, by the wireless access device, resource allocation information to the mobile device comprises:

sending, by the wireless access device, the dedicated control information to the mobile device, wherein the dedicated control information comprises the resource allocation information.

5. The resource allocation method according to claim 1, wherein the sending, by the wireless access device, resource allocation information to the mobile device comprises:

sending, by the wireless access device, control information to the mobile device, wherein the control information comprises the resource allocation information.

6. The resource allocation method according to claim 1, wherein the resource allocation method further comprises:

sending, by the wireless access device, common system information, wherein the common system information comprises resource information of dedicated system information, the common system information is system information in the common frequency range of the at least two AI technologies on the first carrier, the dedicated system information is system information in a frequency range separately occupied on the first carrier by each AI technology of the at least two AI technologies, and the resource information of the dedicated system information is used by the mobile device to receive the dedicated system information; and sending, by the wireless access device, the dedicated system information.

7. A resource allocation method, comprising:

receiving, by a mobile device, resource allocation information sent by a wireless access device, wherein the resource allocation information is used to indicate at least two resources allocated on a first carrier by the wireless access device, the at least two resource are separate frequency ranges allocated by the wireless acces device on the first carrier and occupied by separate air interface (AI) technologies used to transmit a service between the mobile device and the wireless access device, at least two (AI) technologies to be used to transmit the service between the mobile device and the wireless access device, and the at least two AI technologies are in a one-to-one correspondence with the at least two resources; and using, by the mobile device according to the resource allocation information and on each resource of the at least two resources indicated by the first resource allocation information, an AI technology and a frequency range corresponding to the resource to transmit the service between the mobile device and the wireless access device on the first carrier.

8. The resource allocation method according to claim 7, wherein before the receiving, by mobile device, resource allocation information sent by a wireless access device, the resource allocation method further comprises:

receiving, by the mobile device, common control information sent by the wireless access device, wherein the common control information comprises resource information of dedicated control information, the common control information is control information in a common frequency range of the at least two AI technologies on the first carrier, and the dedicated control information is control information in a frequency range separately occupied on the first carrier by each AI technology of the at least two AI technologies; and the receiving, by the mobile device, resource allocation information sent by a wireless access device comprises:

receiving, by the mobile device according to the resource information of the dedicated control information, the dedicated control information sent by the wireless access device, wherein the dedicated control information comprises the resource allocation information.

9. The resource allocation method according to claim 7, wherein before the receiving, by mobile device, resource allocation information sent by a wireless access device, the resource allocation method further comprises:

receiving, by the mobile device, a radio resource control (RRC) reconfiguration message sent by the wireless access device, wherein the RRC reconfiguration message comprises resource information of dedicated control information, the resource information of the dedicated control information comprises a resource location of the dedicated control information and an index of the dedicated control information, and the dedicated control information is control information in a frequency range separately occupied on the first carrier by each AI technology of the at least two AI technologies;

receiving, by the mobile device, common control information sent by the wireless access device, wherein the common control information comprises the index of the dedicated control information, and the common control information is control information in a common frequency range of the at least two AI technologies on the first carrier;

the receiving, by the mobile device, resource allocation information sent by a wireless access device comprises:

receiving, by the mobile device according to the index of the dedicated control information and the resource information of the dedicated control information, the dedicated control information sent by the wireless access device, wherein the dedicated control information comprises the resource allocation information.

10. The resource allocation method according to claim 7, wherein the receiving, by the mobile device, resource allocation information sent by a wireless access device comprises:

receiving, by the mobile device, control information sent by the wireless access device, wherein the control information comprises the resource allocation information.

11. The resource allocation method according to claim 7, wherein the resource allocation method further comprises:

receiving, by the mobile device, common system information sent by the wireless access device, wherein the common system information comprises resource information of dedicated system information, the common system information is system information in the common frequency range of the at least two AI technologies on the first carrier, and the dedicated system information is system information in a frequency range separately occupied on the first carrier by each AI technology of the at least two AI technologies; and receiving, by the mobile device according to the resource information of the dedicated system information, the dedicated system information sent by the wireless access device.

12. The resource allocation method according to claim 7, wherein the resource allocation method further comprises:

receiving, by the mobile device, measurement configuration information or demodulation reference signals (DMRSs) that are sent by the wireless access device and that correspond to the at least two AI technologies, wherein the measurement configuration information or the DMRSs are used to instruct the mobile device to perform radio resource management (RRM) measurement or channel state information (CSI) measurement; and separately performing, by the mobile device, RRM measurement or CSI measurement corresponding to the at least two AI technologies according to the measurement configuration information or the DMRSs, wherein the measurement configuration information is carried in at least one of the dedicated control information, the dedicated system information, or the RRC reconfiguration message.

13. A wireless access device, comprising:

at least one processor, configured to determine at least two air interface (AI) technologies to be used to transmit a service between mobile device and the wireless access device;

the at least one processor, configured to allocate, on a first carrier, at least two resources that are in a one-to-one correspondence with the at least two AI technologies determined by the at least one processor, wherein the at least two resources are separate frequency ranges allocated by the wireless acces device on the first carrier and occupied by separate AI technolgoies used to transmit the service between the mobile device and the wireless access device; and a communication circuit, configured to send resource allocation information to the mobile device, wherein the resource allocation information is used to indicate each resource and frequency range that is allocated by the at least one processor and that corresponds to the separate frequency ranges allocated to the at least two AI technologies to be used by mobile device that receives the resource allocation information when transmitting the service between the mobile device and the wireless access device on the first carrier.

14. The wireless access device according to claim 13, wherein the at least one processor is configured to: obtain first information, and determine, according to the first information, the at least two AI technologies to be used to transmit the service between the mobile device and the wireless access device, wherein the first information is used to determine the at least two AI technologies.

15. The wireless access device according to claim 13, wherein the communication circuit is further configured to: before sending the resource allocation information to the mobile device, send common control information to the mobile device, wherein the common control information comprises resource information of dedicated control information, the common control information is control information in a common frequency range of the at least two AI technologies on the first carrier, the dedicated control information is control information in a frequency range separately occupied on the first carrier by each AI technology of the at least two AI technologies, and the resource information of the dedicated control information is used by the mobile device to receive the dedicated control information;

the communication circuit is configured to send the dedicated control information to the mobile device, wherein the dedicated control information comprises the resource allocation information.

16. A mobile device, comprising:

a communication circuit, configured to receive resource allocation information sent by a wireless access device, wherein the resource allocation information is used to indicate at least two resources allocated on a first carrier by the wireless access device, the at least two resources are separate frequency ranges allocated by the wireless acces device on the first carrier and occupied by separate air interface (AI) technolgoies used to transmit a service between the mobile device and the wireless access device, at least two AI technologies to be used to transmit the service between the mobile device and the wireless access device, and the at least two AI technologies are in a one-to-one correspondence with the at least two resources; and at least one processor, configured to use, according to the resource allocation information received by the communication circuit and on each resource of the at least two resources indicated by the first resource allocation information, an AI technology and a frequency range corresponding to the resource to transmit the service between the mobile device and the wireless access device on the first carrier.

17. The mobile device according to claim 16, wherein the communication circuit is further configured to: before receiving the resource allocation information sent by the wireless access device, receive common control information sent by the wireless access device, wherein the common control information comprises resource information of dedicated control information, the common control information is control information in a common frequency range of the at least two AI technologies on the first carrier, and the dedicated control information is control information in a frequency range separately occupied on the first carrier by each AI technology of the at least two AI technologies; and the communication circuit is configured to receive, according to the resource information of the dedicated control information, the dedicated control information sent by the wireless access device, wherein the dedicated control information comprises the resource allocation information.

18. The mobile device according to claim 16, wherein the communication circuit is further configured to: before receiving the resource allocation information sent by the wireless access device, receive a radio resource control (RRC) reconfiguration message and common control information sent by the wireless access device, wherein the RRC reconfiguration message comprises resource information of dedicated control information, the resource information of the dedicated control information comprises a resource location of the dedicated control information and an index of the dedicated control information, the dedicated control information is control information in a frequency range separately occupied on the first carrier by each AI technology of the at least two AI technologies, the common control information comprises the index of the dedicated control information, and the common control information is control information in a common frequency range of the at least two AI technologies on the first carrier; and the communication circuit is configured to receive, according to the index of the dedicated control information and the resource information of the dedicated control information, the dedicated control information sent by the wireless access device, wherein the dedicated control information comprises the resource allocation information.

19. The mobile device according to claim 16, wherein the communication circuit is configured to receive control information sent by the wireless access device, wherein the control information comprises the resource allocation information.

20. The mobile device according to claim 16, wherein the communication circuit is further configured to: receive common system information sent by the wireless access device, wherein the common system information comprises resource information of dedicated system information, and receive, according to the resource information of the dedicated system information, the dedicated system information sent by the wireless access device, the common system information is system information in the common frequency range of the at least two AI technologies on the first carrier, and the dedicated system information is system information in a frequency range separately occupied on the first carrier by each AI technology of the at least two AI technologies.

* * * * *

UNITED STATES PATENT AND TRADEMARK OFFICE
CERTIFICATE OF CORRECTION

PATENT NO.        : 10,631,296 B2
APPLICATION NO.   : 15/940450
DATED             : April 21, 2020
INVENTOR(S)       : Jian Zhang et al.

Page 1 of 1

It is certified that error appears in the above-identified patent and that said Letters Patent is hereby corrected as shown below:

In the Claims

Claim 3, Column 53, Line 40, replace "two A1 technologies" with --two AI technologies--.

Claim 7, Column 54, Line 44, replace "two resource" with --two resources--.

Claim 7, Column 54, Line 49, replace "(AI)" with --AI--.

Claim 20, Column 58, Line 48, replace "A1" with --AI--.

Signed and Sealed this
Nineteenth Day of January, 2021

Andrei Iancu
*Director of the United States Patent and Trademark Office*